(12) United States Patent
Hasegawa et al.

(10) Patent No.: US 10,594,527 B2
(45) Date of Patent: Mar. 17, 2020

(54) TRANSMITTING APPARATUS, RECEIVING APPARATUS, TRANSMITTING METHOD, AND RECEIVING METHOD

(71) Applicant: Mitsubishi Electric Corporation, Chiyoda-ku (JP)

(72) Inventors: Fumihiro Hasegawa, Tokyo (JP); Akinori Taira, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 26 days.

(21) Appl. No.: 15/568,501

(22) PCT Filed: Aug. 7, 2015

(86) PCT No.: PCT/JP2015/072541
§ 371 (c)(1),
(2) Date: Oct. 23, 2017

(87) PCT Pub. No.: WO2017/026009
PCT Pub. Date: Feb. 16, 2017

(65) Prior Publication Data
US 2018/0115447 A1    Apr. 26, 2018

(51) Int. Cl.
*H04L 27/26* (2006.01)
*H04J 11/00* (2006.01)
(Continued)

(52) U.S. Cl.
CPC ........ *H04L 27/2613* (2013.01); *H04J 11/003* (2013.01); *H04J 11/0023* (2013.01);
(Continued)

(58) Field of Classification Search
CPC . H04L 27/2613; H04L 25/00; H04L 27/2602; H04L 5/0007; H04L 27/2627; H04J 11/0023
See application file for complete search history.

(56) References Cited

U.S. PATENT DOCUMENTS

2003/0012160 A1   1/2003  Webster et al.
2009/0252104 A1   10/2009  Zhang et al.
(Continued)

FOREIGN PATENT DOCUMENTS

CN    101242388 A    8/2008
JP    2005-528002 A    9/2005
(Continued)

OTHER PUBLICATIONS

Combined Office Action and Search Report dated Sep. 3, 2018 in Chinese Patent Application No. 201580081127.3, citing document AO therein, 14 pages (with unedited computer generated English translation of the Office Action and English translation of categories of cited documents).

(Continued)

*Primary Examiner* — Christine Ng
(74) *Attorney, Agent, or Firm* — Oblon, McClelland, Maier & Neustadt, L.L.P.

(57) ABSTRACT

A transmitting apparatus includes a first signal generating unit that generates, on the basis of data a first signal transmitted by single carrier block transmission; a second signal generating unit that generates, on the basis of an RS, a second signal transmitted by orthogonal frequency division multiplex transmission; a switching operator that selects and outputs the second signal in a first transmission period and selects and outputs the first signal in a second transmission period; an antenna that transmits the signal output from the switching operator; and a control-signal generating unit that controls the second signal generating unit such that, in the first transmission period, the RS is arranged in a frequency band allocated for transmission of the RS from the transmitting apparatus among frequency bands usable in OFDM.

6 Claims, 18 Drawing Sheets

(51) Int. Cl.
*H04L 5/00* (2006.01)
*H04W 72/04* (2009.01)
*H04L 25/03* (2006.01)
*H04L 25/02* (2006.01)

(52) U.S. Cl.
CPC ........ *H04L 5/0007* (2013.01); *H04L 27/2602* (2013.01); *H04L 27/265* (2013.01); *H04L 27/2627* (2013.01); *H04L 27/2657* (2013.01); *H04L 27/2662* (2013.01); *H04W 72/0453* (2013.01); *H04J 2211/006* (2013.01); *H04L 25/022* (2013.01); *H04L 25/03159* (2013.01); *H04L 2025/03414* (2013.01)

(56) References Cited

U.S. PATENT DOCUMENTS

| | | | |
|---|---|---|---|
| 2009/0310549 | A1 | 12/2009 | Higuchi et al. |
| 2010/0091919 | A1* | 4/2010 | Xu ................... H04L 1/0025 375/346 |
| 2011/0026471 | A1 | 2/2011 | Miki et al. |
| 2011/0051650 | A1* | 3/2011 | Winstok ............ H04W 4/08 370/312 |
| 2011/0164532 | A1* | 7/2011 | Kawamura ........ H04L 1/0017 370/254 |
| 2012/0155412 | A1 | 6/2012 | Kawamura et al. |
| 2012/0250625 | A1* | 10/2012 | Kim ................... H04L 5/001 370/328 |
| 2013/0114461 | A1* | 5/2013 | Seo .................... H04L 1/1861 370/252 |
| 2013/0188596 | A1 | 7/2013 | Miki et al. |

FOREIGN PATENT DOCUMENTS

| | | |
|---|---|---|
| JP | 2010-508791 A | 3/2010 |
| JP | 2011-527854 A | 11/2011 |
| WO | 03/005652 A1 | 1/2003 |
| WO | 2008/053895 A1 | 5/2008 |
| WO | 2008/057969 A2 | 5/2008 |
| WO | 2009/022706 A1 | 2/2009 |
| WO | 2009/119671 A1 | 10/2009 |
| WO | 2009/126440 A1 | 10/2009 |
| WO | 2011/016414 A1 | 2/2011 |

OTHER PUBLICATIONS

Myung, Hyung G., et al., "Single Carrier FDMA for Uplink Wireless Transmission", IEEE Vehicular Technology Magazine, Sep. 2006, pp. 30-38.

Benvenuto, Nevio, et, al, "Single Carrier Modulation With Nonlinear Frequency Domain Equalization: An Idea Whose Time Has Come—Again", Proceedings of the IEEE, vol. 98, No. 1, Jan. 2010, pp. 69-96.

Bingham, John A. C., "Multicarrier Modulation for Data Transmission: An Idea Whose Time Has Come", IEEE Communications Magazine, vo. 28, No. 5, May 1990, 8 pages.

Porat, Boaz, "A Course in Digital Signal Processing", John Wiley and Sons Inc., 1997, 2 pages.

Hasegawa, Fumihiro, et al., "A Novel PAPR Reduction Scheme for SC-OFDM with Frequency Domain Multiplexed Pilots", IEEE Communications Letters, vol. 16, No. 9, Sep. 2012, 6 pages.

Miyake, Yuji, et al., "Hybrid Single-Carrier and Multi-Carrier System: Evaluation of Throughput with Inter-Cell Interference", 2012 IEEE 23rd International Symposium on Personal Indoor and Mobile Radio Communications (PIMRC), Sep. 2012, 8 pages.

International Search Report dated Oct. 13, 2015 in PCT/JP2015/072541, filed on Aug. 7, 2015.

Partial Supplementary European Search Report dated Mar. 11, 2019 in the corresponding European Application No. 15900964.6 citing document AX therein 17 pages.

Darko, S. et al., "On low-complexity linear channel estimation and frequency-domain equalization in SC-FDMA", Software, Telecommunications and Computer Networks (SOFTCOM), 2012 20$^{th}$ International Conference on, IEEE, XP032470558, Sep. 11, 2012, pp. 1-5.

Extended European Search Report dated Jul. 3, 2019 in European Application No. 15900964.6.

* cited by examiner

TRANSMITTING APPARATUS, RECEIVING APPARATUS, TRANSMITTING METHOD, AND RECEIVING METHOD

FIELD

The present invention relates to a transmitting apparatus, a receiving apparatus, a transmitting method, and a receiving method for performing block transmission.

BACKGROUND

In digital communication systems, single carrier (SC) block transmission schemes have attracted attention of late (see, for example, Non Patent Literature 1 described below).

As an SC block transmission scheme capable of multiplexing communication signals of a plurality of users, that is, for multi-user multiplexing, there is an SC-FDMA (Single Carrier Frequency Division Multiple Access) scheme. In the SC-FDMA scheme, in general, frequency bands are allocated to the users and the communication signals of the users are multiplexed on frequencies. Details of the SC-FDMA scheme are described in Non Patent Literature 3 and the like. The SC-FDMA scheme is used for an uplink, which is a communication path for transmission from a terminal, that is, a user terminal (User Equipment: UE) to a base station, in a communication system of an LTE (Long Term Evolution)-Advanced scheme or the like. As a reason why the SC block transmission scheme is used for the uplink, because a transmission signal with a reduced ratio of peak power/average power can be generated, it is possible to expect, for example, relaxation of request performance for an amplifier and the like used in a transmission system of the UE.

CITATION LIST

Non Patent Literature

Non Patent Literature 1: N. Benvenuto, R. Dinis, D. Falconer and S. Tomasin, "Single Carrier Modulation With Nonlinear Frequency Domain Equalization: An Idea Whose Time Has Come-Again", Proceedings of the IEEE, vol. 96, No. 1, January 2010, pp. 69-96.
Non Patent Literature 2: J. A. C. Bingham, "Multicarrier Modulation for Data Transmission: An Idea Whose Time Has Come", IEEE Commun. Mag., vol. 26, No. 5, May 1990, pp. 5-14.
Non Patent Literature 3: H. G. Myung, et. Al, "Single Carrier FDMA for Uplink Wireless Transmission", IEEE Vehicular Tech. Magazine, September 2006, pp. 30-38.

SUMMARY

Technical Problem

However, in the SC-FDMA scheme, when, for example, a known signal used for channel estimation, symbol synchronization, frame synchronization, or user distinction is transmitted as a signal on a frequency band used for transmission, the known signal is transmitted using the entire frequency band. For example, in the communication system of the LTE-Advanced scheme, a known signal called RS (Reference Symbol) is transmitted from the UE to the base station, that is, an NB (Node B). In this case, the UE is a transmitting apparatus that transmits the RS, which is the known signal.

When the communication system of such an SC-FDMA scheme is used, when a plurality of UEs transmit RSs to the same base station in the same frequency band, one of the RSs from the respective UEs needs to be arranged in one slot. The slot is one of units of a communication time. For example, the base station performs channel estimation per slot. One slot is configured by a plurality of blocks. The block is a unit of a communication time. As described above, when the SC-FDMA system is used, because RSs are transmitted using the same band width as the band width of the user data, when a plurality of UEs transmit the RSs, blocks as many as the number of UEs are occupied for the RSs in one slot. Therefore, in the SC-FDMA scheme, when the UEs transmit the RSs, there is a problem in that deterioration in transmission efficiency occurs.

The present invention has been devised in view of the above, and an object of the present invention is to obtain a transmitting apparatus, a receiving apparatus, a transmitting method, and a receiving method that can realize multiplexing of transmission of known signals from a plurality of transmitting apparatuses while suppressing deterioration in transmission efficiency.

Solution to Problem

To solve the problems and achieve the object, a transmitting apparatus according to the present invention includes: a first signal generating unit to generate, on the basis of data, a first signal transmitted by single carrier block transmission; and a second signal generating unit to generate, on the basis of a known signal, a second signal transmitted by orthogonal frequency division multiplex transmission. The transmitting apparatus includes a switching operator to receive inputs of the first signal and the second signal, select and output the second signal in a first transmission period, and select and output the first signal in a second transmission period; and an antenna to transmit the signal output from the switching operator. Further, the transmitting apparatus includes a control unit to control the second signal generating unit such that, in the first transmission period, the known signal is arranged in a frequency band allocated for transmission of the known signal from the transmitting apparatus among frequency bands usable in the orthogonal frequency division multiplex transmission.

Advantageous Effects of Invention

The transmitting apparatus according to the present invention achieves an effect that it is possible realize multiplexing of transmission of known signals from a plurality of transmitting apparatuses while suppressing deterioration in transmission efficiency.

DESCRIPTION OF EMBODIMENTS

Transmitting apparatuses, receiving apparatuses, transmitting methods, and receiving methods according to embodiments of the present invention are described in detail below with reference to the drawings. Note that the present invention is not limited to the embodiments.

First Embodiment

Figure 1:
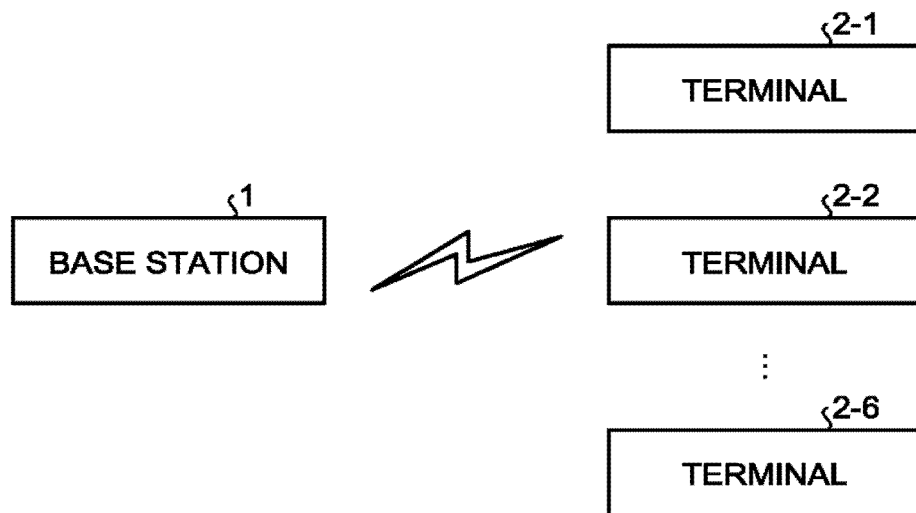
FIG. 1 is a diagram illustrating an example configuration of a communication system according to a first embodiment.

FIG. 1 is a diagram illustrating an example configuration of a communication system according to a first embodiment of the present invention. The communication system in this embodiment includes a base station 1 and terminals 2-1 to 2-6. In FIG. 1, an example is illustrated in which the number of base stations is one and the number of terminals is six. However, the number of base stations is not limited to one and the number of terminals is not limited to six. The terminals to 2-6 are communication apparatuses and are also called user terminals or UEs. The terminals 2-1 to 2-6 transmit RSs, which are known signals and are described below, to the base station 1. The base station 1 is a communication apparatus that allocates the resources of an uplink, which is a communication path in a direction from the terminals 2-1 to 2-6 to the base station 1, to the terminals 2-1 to 2-6. During uplink communication, the terminals 2-1 to 2-6 are transmitting apparatuses and the base station 1 is a receiving apparatus. In the following description, where it is appropriate for the terminals 2-1 to 2-6 to be described without being distinguished from one another, the terminals 2-1 to 2-6 are described as terminal 2.

For data transmission along the uplink, the communication system in this embodiment uses communication scheme based on an SC-FDMA scheme. Any scheme can be used as a communication scheme for the downlink, which is a communication path in a direction from the base station 1 to the terminals 2-1 to 2-6. An example of a communication scheme used for the downlink is an OFDM scheme.

Figure 2:
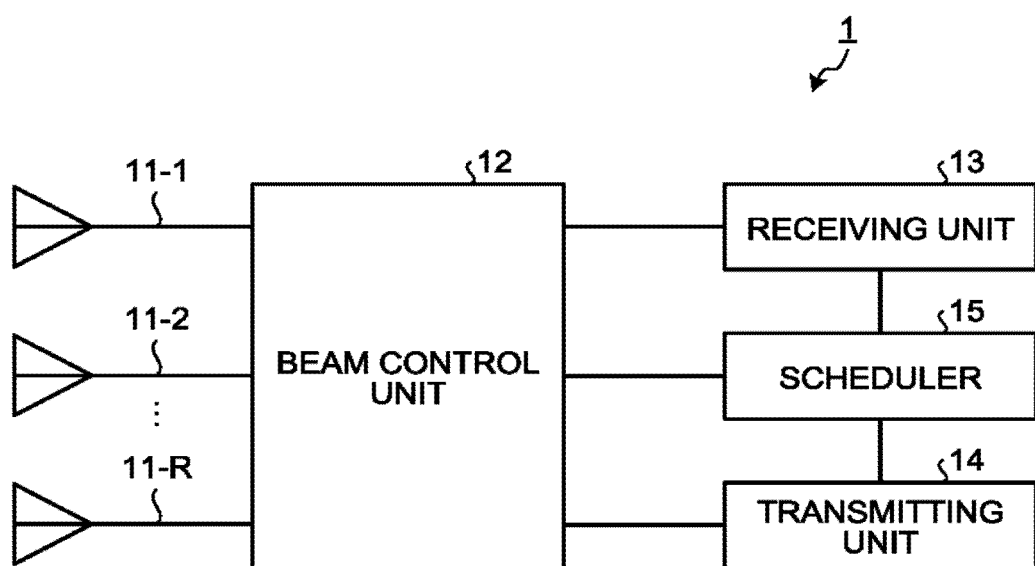
FIG. 2 is a diagram illustrating a functional configuration example of a base station in the first embodiment.

FIG. 2 is a diagram illustrating an example of a functional configuration of the base station 1. The base station 1 includes antennas 11-1 to 11-R, a beam control unit 12, a receiving unit 13, a transmitting unit 14, and a scheduler 15. R is an integer equal to or larger than 2. The base station 1 generates an analog beam, which is a transmission beam, by using the antennas 11-1 to 11-R. The analog beam has directivity for irradiating in one or more directions. That is, the antennas 11-1 to 11-R are capable of generating a beam, i.e., an analog beam, for irradiating in one or more irradiation directions. As described below, the beam control unit 12 can switch beams every fixed time period, e.g., per slot. When the base station 1 determines the directions in which the terminals are located, it generates an analog beam to irradiate in the directions of the terminals 2. That is, when the directions in which the terminals 2 are located have been determined, each of the one or more irradiation directions of the analog beam is set to a direction corresponding to the direction in which the one or more terminals 2 are located. The base station 1 can perform communication with a plurality of terminals 2 by generating analog beams that each irradiates a corresponding terminal 2.

The receiving unit 13 carries out reception processing on received signals received via the antennas 11-1 to 11-R and the beam control unit 12. The receiving unit 13 receives data and RSs transmitted from the one or more terminals 2. Details of the configuration and the processing of the receiving unit 13 are described blow. The transmitting unit 14 applies, for each of the terminals 2, transmission processing to data addressed to the terminal 2 in order to generate a data signal and outputs the generated data signal to the beam control unit 12. The transmitting unit 14 generates control information addressed to the terminal 2, applies the transmission processing to the generated control information to generate a control signal, and outputs the generated control signal to the beam control unit 12. The transmission processing includes, for example, encoding processing and modulation processing. When an OFDM scheme is used for the downlink, the transmission processing includes IDFT (Inverse Discrete Fourier Transform) processing.

The beam control unit 12 controls generation of an analog beam, i.e., beam forming, using the antennas 11-1 to 11-R. Specifically, for example, the beam control unit 12 determines the orientation of the analog beam on the basis of position information, which is information indicating the positions of the terminals 2, and position information on the base station 1, and then, on the basis of the orientation, it determines a beam forming weighting. The position information of the terminals 2 is, example, position information calculated by the terminals sing GPS (Global Positioning System). The terminals 2 transmit the position information to the base station 1. The position information on the base station 1 is, for example, position information calculated by the base station 1 using GPS. The beam control unit 12 multiplies the data signal and the control signal of each of the terminals 2 input from the transmitting unit 14 with the beam forming weighting and outputs the data signal and the control signal to the antennas 11-1 to 11-R. The beam control unit 12 outputs signals received from the antennas 11-1 to 11-R to the receiving unit 13. As described below, the beam control unit 12 can switch between beams during a given period of time, e.g., a slot. Note that the beam control unit 12 and the antennas 11-1 to 11-R can be capable of simultaneously generating a plurality of analog beams.

The scheduler 15 receives control signals requesting a connection, a resource allocation request for requesting allocation of resources, and the like from the terminals 2 via the antennas 11-1 to 11-R and the receiving unit 13 and identifies the connected terminals 2 on the basis of the control signals. The amount of data requested by the terminals 2 for allocation to the control signals requesting a connection, the resource allocation request, and the like can be stored. The resource allocation request can be a control signal used in an LTE or the like. The scheduler 15 acquires the amount of data requested from the terminals 2 on the basis of the control signals and allocates resources to the terminals 2 on the basis of the amount of data. Details of a method of allocating resources are described below.

Figure 3:
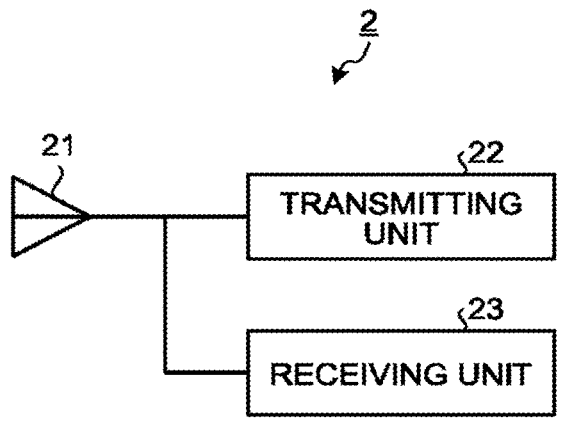
FIG. 3 is a diagram illustrating a functional configuration example of a terminal in the first embodiment.

FIG. 3 is a diagram illustrating an example of a functional configuration of the terminal in this embodiment. As illustrated in FIG. 3, the terminal 2 includes an antenna 21, a transmitting unit 22, and a receiving unit 23. The receiving unit carries out reception processing on a signal received by the antenna 21. When the received signal is a control signal, the receiving unit 23 carries out the processing indicated by the control signal. The reception processing includes, for example, demodulation processing and decoding processing. When the OFDM scheme is used for the downlink, the reception processing includes DFT (Discrete Fourier Transform) processing. The transmitting unit 22 generates a signal transmitted to the base station 1 and transmits the signal via the antenna 21. Details of the configuration and the processing of the transmitting unit 22 are described below.

As described above, the communication system in this embodiment uses a communication scheme based on a SC-FDMA scheme for the data transmission in the uplink.

Figure 4:
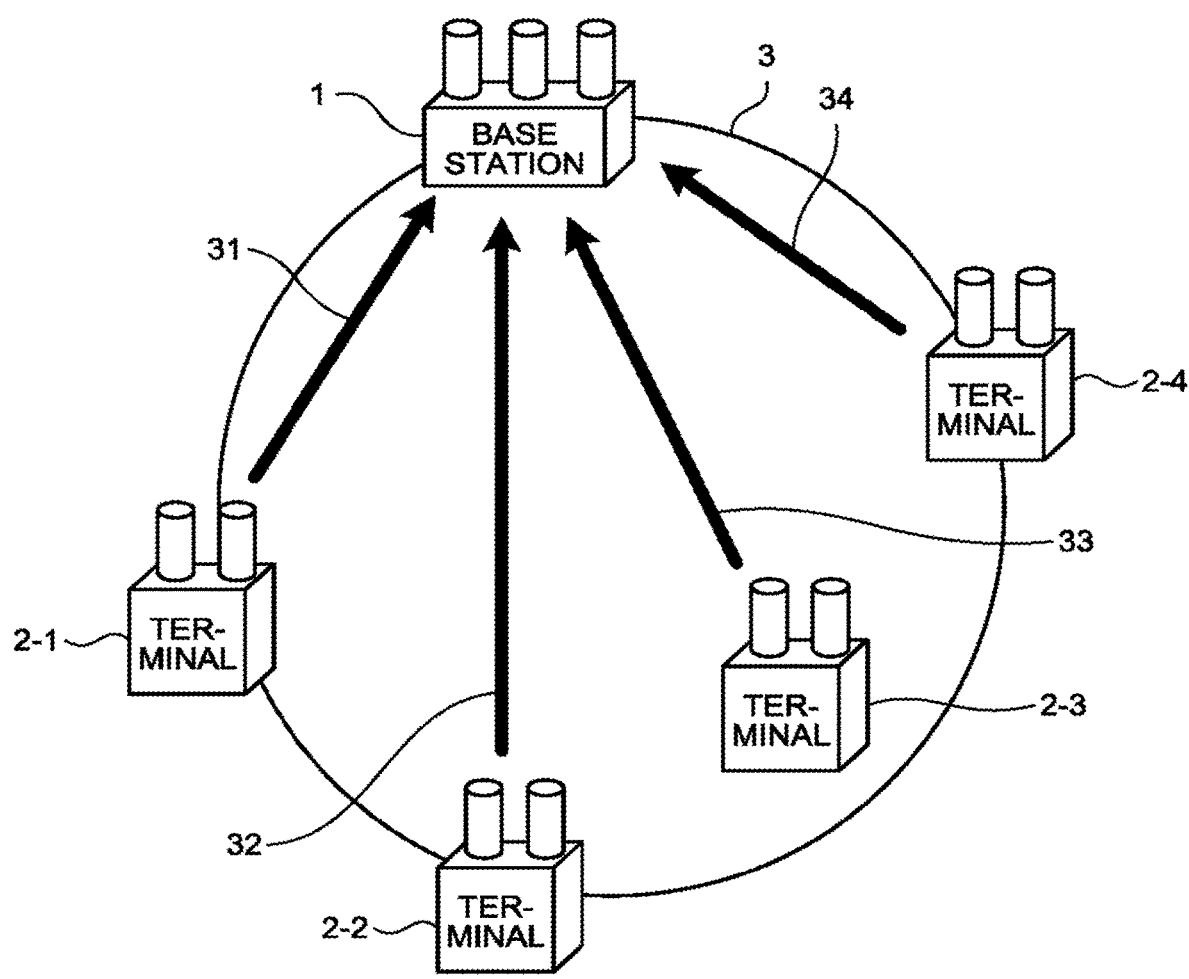
FIG. 4 is a diagram illustrating an example of an analog beam formed by a base station in the first embodiment.

In this embodiment, an example is described in which the base station 1 can switch analog beams for every slot. FIG. 4 is a diagram illustrating an example of the analog beam generated by the base station 1. As illustrated in FIG. 4, the base station 1 is capable of generating an analog beam 3 that irradiates a plurality of terminals. The analog beam 3 schematically illustrates a schematic envelope region of the shape of the analog beam generated by the base station 1. Reference numerals 31 to 34 in FIG. 4 denote transmitting directions of signals of the uplink from the terminals 2-1 to 2-4. In the example illustrated in FIG. 4, an example is illustrated in which the base station 1 determines the positions of the terminals 2-1 to 2-4 and generates the analog beam 3 that includes the terminals 2-1 to 2-4 within its range of irradiation.

Figure 5:
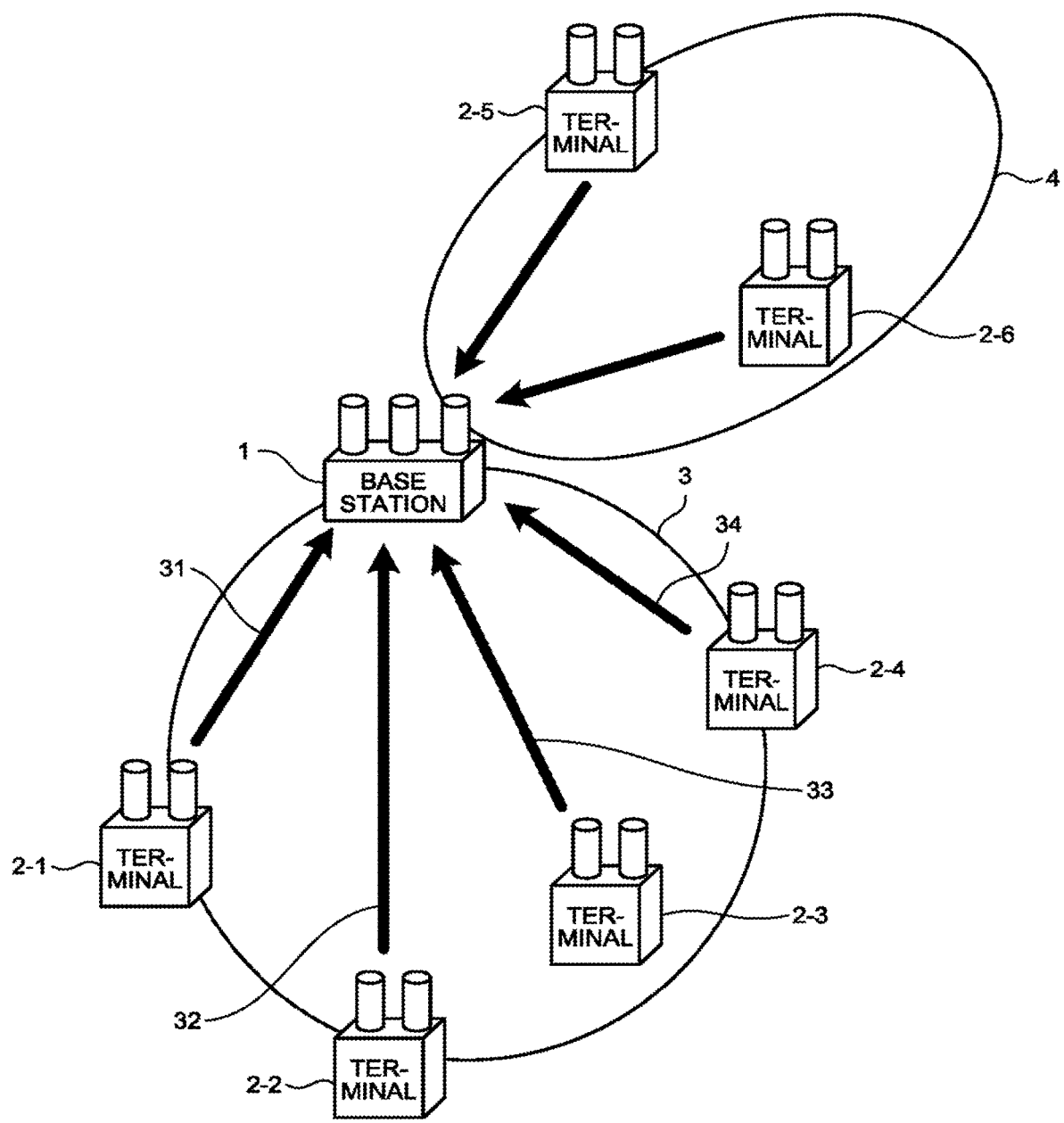
FIG. 5 is a diagram illustrating an example of switching of antenna beams in the first embodiment.

FIG. 5 is a diagram illustrating an example of the switching between the analog beams. In the example illustrated in FIG. 5, the base station 1 switches the antenna beams every slot. An example is illustrated in which the analog beam 3 is generated in a k-th slot and an analog beam 4 is generated in a (k+1)-th slot. Note that k is an integer indicating the number of a slot and is an integer equal to or larger than 0 or an integer equal to or larger than 1. The analog beam 3 generated in the k-th slot in FIG. 5 is the same as the analog beam 3 in the example illustrated in FIG. 4. In the (k+1)-th slot, the analog beam 4 is generated to irradiate the terminals 2-5 and 2-6.

In FIG. 5, an example is illustrated in which the terminals 2 that are functioning as communication targets are different in two slots. In such a case, as illustrated in FIG. 5, the switching between the analog beams is performed every slot. Note that, in FIG. 5, the example described is one in which the analog beams are switched once per slot. However, the switching among the analog beams once per slot does not always have to be carried out. For example, when only one analog beam is able to irradiate all the terminals 2, then switching of the analog beams does not have to be performed.

When the analog beams are switched once per the terminal 2 at a transmission source of a signal received by the base station 1 in the uplink changes for each slot. Therefore, it is desirable that the base station 1 receives an RS from the terminal 2 in each of the slots.

Figure 6:
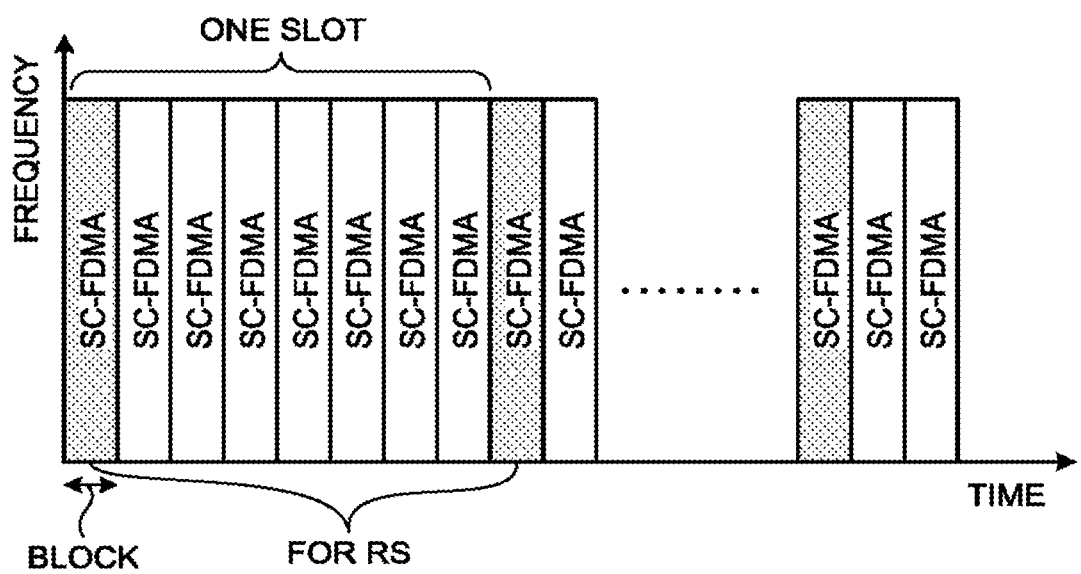
FIG. 6 is a diagram illustrating an example in which one block is allocated for an RS in an SC-FDMA scheme.

FIG. 6 is a diagram illustrating an example in which one block is allocated as an RS when the SC-FDMA scheme is used in all of the slots of the uplink. FIG. 6 illustrates an example in which, when one terminal 2 is connected to the base station 1, one block is allocated per one slot as an RS of the terminal 2. Hatched blocks indicate blocks that are an RS. In the example illustrated in FIG. 6, one slot is made up of eight blocks. Note that when one terminal 2 is connected to the base station 1, one block is used for an RS per one slot. However, when a plurality of terminals 2 are connected to the base station 1, a plurality of blocks are used for the RS per one slot. For example, when four terminals 2 are connected to the base station 1, among the eight blocks from which the one slot is configured, four blocks are used for an RS and the number of blocks for transmitting data is four.

In this embodiment, one or more blocks used for transmitting an RS are provided in a slot. In the blocks used for transmitting the RS, signals are transmitted by the OFDM scheme. In the following description, a signal transmitted by the SC-FDMA scheme is referred to as SC-FDMA signal. A signal transmitted by the OFDM scheme is referred to as OFDM signal. A block that transmits the SC-FDMA signal is referred to as an SC-FDMA block. A block that transmits the OFDM signal is referred to as an OFDM block.

When tie total number of blocks in one slot is represented as $N_B$, the number of OFDM blocks in one slot is represented as $N_O$, and the number of SC-FDMA blocks in one slot is represented as $N_S$, $N_B=N_O+N_S$. In the following description, in this embodiment, an example in which $N_B=5$, $N_O=1$, and $N_S=4$ is described. However, the values of $N_B$, $N_O$, and $N_S$ are not limited to these values.

Figure 7:
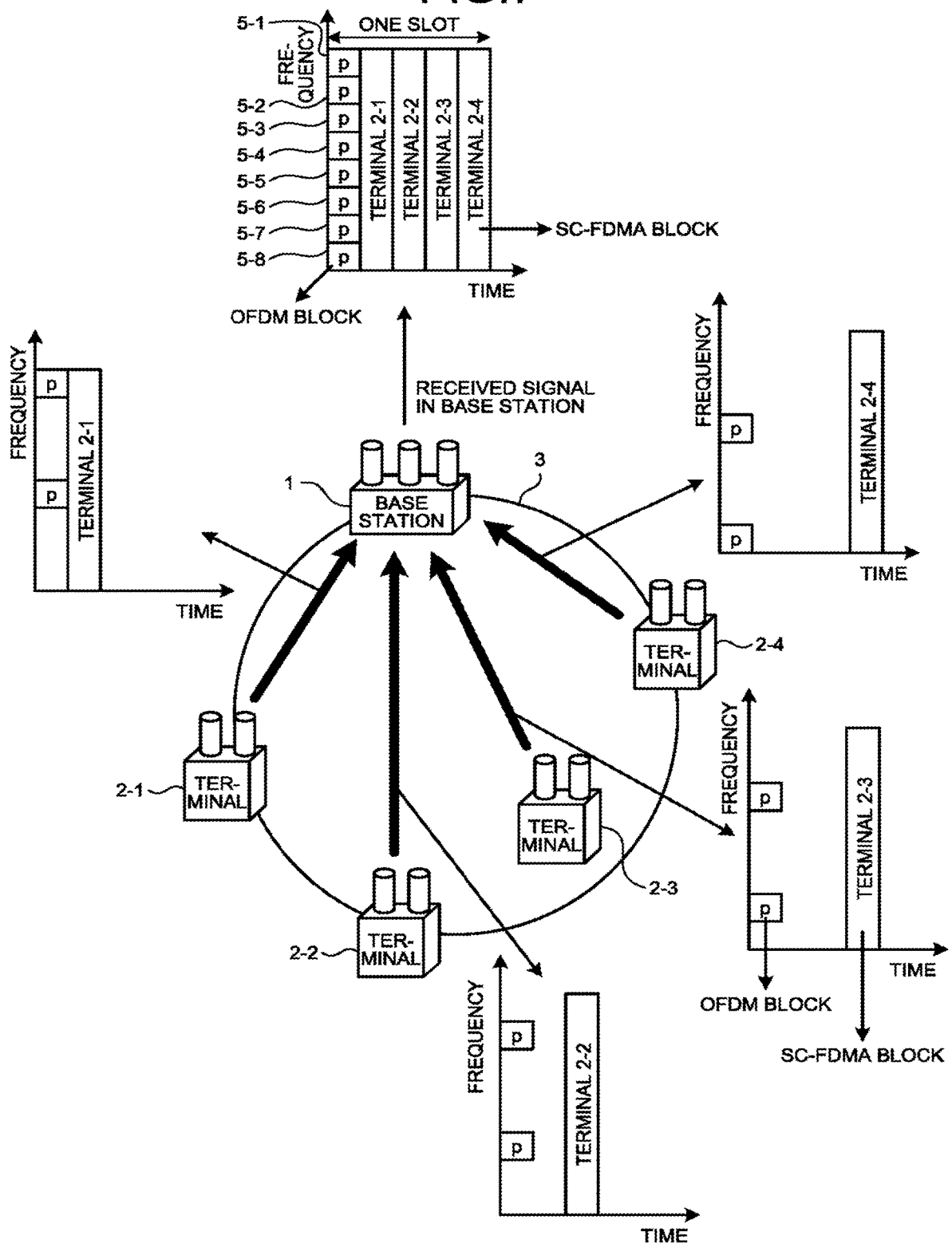
FIG. 7 is a diagram illustrating an example of resource allocation to terminals in the first embodiment.

FIG. 7 is a diagram illustrating an example of how resources are allocated to the terminals 2 in this embodiment. In FIG. 7, an example is illustrated of the result in one slot in the uplink of the terminals 2-1 to 2-4 of a resource allocation performed by the base station 1. In the example illustrated in FIG. 7, a first block in the one slot is an OFDM block for transmitting an RS. In FIG. 7, resources allocated for an RS of the terminals 2 are indicated by rectangles labeled with a p.

As illustrated in FIG. 7, a first OFDM block in the one slot is made up of eight frequency bands of bands 5-1 to 5-8. The bands 5-1 and 5-5 are allocated for RS transmission of the terminal 2-1. The bands 5-2 and 5-6 are allocated for RS transmission of the terminal 2-2. The bands 5-3 and 5-7 are allocated for RS transmission of the terminal 2-3. The bands 5-4 and 5-8 are allocated for R transmission of the terminal 2-1. An SC-FDMA block that is a second block in the one slot is allocated for data of the terminal 2-1. An SC-FDMA block that is a third block in the one slot is allocated for data of the terminal 2-2. An SC-FDMA block that is a fourth block in the one slot is allocated for data of the terminal 2-3. An SC-FDMA block that is a fifth block in the one slot is allocated for data of the terminal 2-4.

The method of allocating resources for data transmission can be any method. For example, a method can be used in which notification is made of the amount of data to be transmitted from the terminal 2 and resources are allocated to the terminals 2 in accordance with this amount of data. A method can be used in which resources are equally allocated to the terminals 2 that perform uplink communication. In the case of a method in which notification is made of the amount of data to be transmitted from the terminals 2, the resources allocated to the terminals 2 by the base station 1 change according to the amount of data requested from the terminals 2 and the amount of unused resources. When notification is made of an allocation result of the resources, when designating a block, the base station 1 can designate the block with a number of the block in a slot. When designating a band in an OFDM block, the base station 1 indicates an allocated band using, for example, a carrier number. Note that a carrier indicates a frequency band and the carrier number indicates a number decided in advance for the frequency band. For example, in an LTE or the like, a collective unit of a plurality of carriers is called a resource block. The base station 1 can allocate bands in the OFDM block per resource block and notify the terminals 2 of the bands allocated to the terminals 2 by using resource block numbers.

For the RSs, which are signals transmitted by the terminals 2, different symbols can be used for each of the terminals 2. The same symbol, i.e., the same RS symbol, can be used among the terminals 2. In the example illustrated in FIG. 7, two bands are allocated for an RS for each of the terminals 2. However, the terminals 2 can each transmit different RS symbols in these two bands. For example, a Zadoff-Chu sequence can be used as the RS symbol. As described above, the terminals 2 transmit the RS symbols according to an OFDM scheme.

FIG. 7 is merely an example, and the positions of the OFDM blocks in the one slot and the order of allocation of the bands making up the OFDM blocks to the terminals 2 are not limited to the example illustrated in FIG. 7. For example, the base station 1 can allocate one band for an RS per one terminal 2 or it can allocate three or more bands for an RS. The OFDM blocks can be provided in a plurality of slots. For example, one or more OFDM blocks can be provided per plurality of slots. That is, the base station 1 only has to provide, for each fixed period, which is one or more slots, an OFDM block in which the terminals 2 perform OFDM transmission, i.e., an OFDM transmission period, and perform allocation of resources such that the terminal 2 performs the SC-FDMA transmission in a period other than the OFDM transmission period.

The base station 1 allocates resources for RS transmission and data transmission to the terminals 2 and transmits a result of the resource allocation to the terminals 2. The base station 1 can execute the resource allocation per slot and notify, for each of the slots, an allocation result to the terminals 2 through the downlink, or it can carry out resource allocation per plurality of slots and notify, for each plurality of slots, an allocation result to the terminals 2 through the downlink. Timing of the resource allocation and of notifying the allocation result are not limited to the above, and the timings only have to be such that they occur when notification is made of the allocation result before transmission of the uplink of the terminals 2 is performed.

As illustrated in FIG. 7, the base station 1 carries out the allocation of resources to the terminals such that frequencies or times of transmission of transmission signals from the terminals 2 do not overlap. As described above, the terminals 2 are notified by the base station 1 beforehand of the resources to be used for transmitting data and RSs from. Therefore, the terminals perform the transmission such that at least one of the frequency and the time is different from another. In the example illustrated in FIG. 7, for example, immediately after transmitting an RS using the OFDM block, the terminal 2-1 transmits data according to the SC-FDMA scheme. The terminal 2-3 waits for two block times after transmitting an RS using an OFDM block and transmits data according to the SC-FDMA scheme. The RSs transmitted from the terminals 2 have different bands.

In this way, in the data and the RSs transmitted from the terminals 2, at least one of the frequency and the time is different from another. Therefore, when the base station 1 receives the signals, the base station 1 can separate the respective signals and can avoid interference among the signals. The base station 1 can receive the RSs from the terminals 2 in one slot, and it can estimate the channels of each of the channels between the base station 1 and the terminals 2. The base station 1 can demodulate the signals received from the terminals 2 using an estimation result of the channels.

In FIG. 7, an example is illustrated in which the RS symbol is transmitted in the OFDM block. However, a signal other than the RS symbol can be transmitted in the OFDM block. For example, a part of a band of the OFDM block can be used for transmitting a control signal other than the RS. Examples of a control signal are, for example, information for deciding directivity of an analog beam of the base station and a request for resource allocation from a terminal to the base station. It is likely that the content of the control signal and presence or absence of transmission of the control signal change for each of the slots. The base station 1 cannot know a change of the control signal in advance. Therefore, for example, it is desirable to allocate, in advance, a band for transmitting the control signal per one slot. When there is no change in the control signal to be transmitted, i.e., when it is unnecessary to perform transmission of different control signals, the terminals 2 transmit, for example, content that is the same as the content of a control signal transmitted last time in a band allocated to the control signal. The terminals 2 can transmit fixed information decided in advance indicating that there is no change from the last information. The base station 1 can determine, for each of the terminals 2, whether a band for transmitting the control signal is allocated in the OFDM block.

Figure 8:
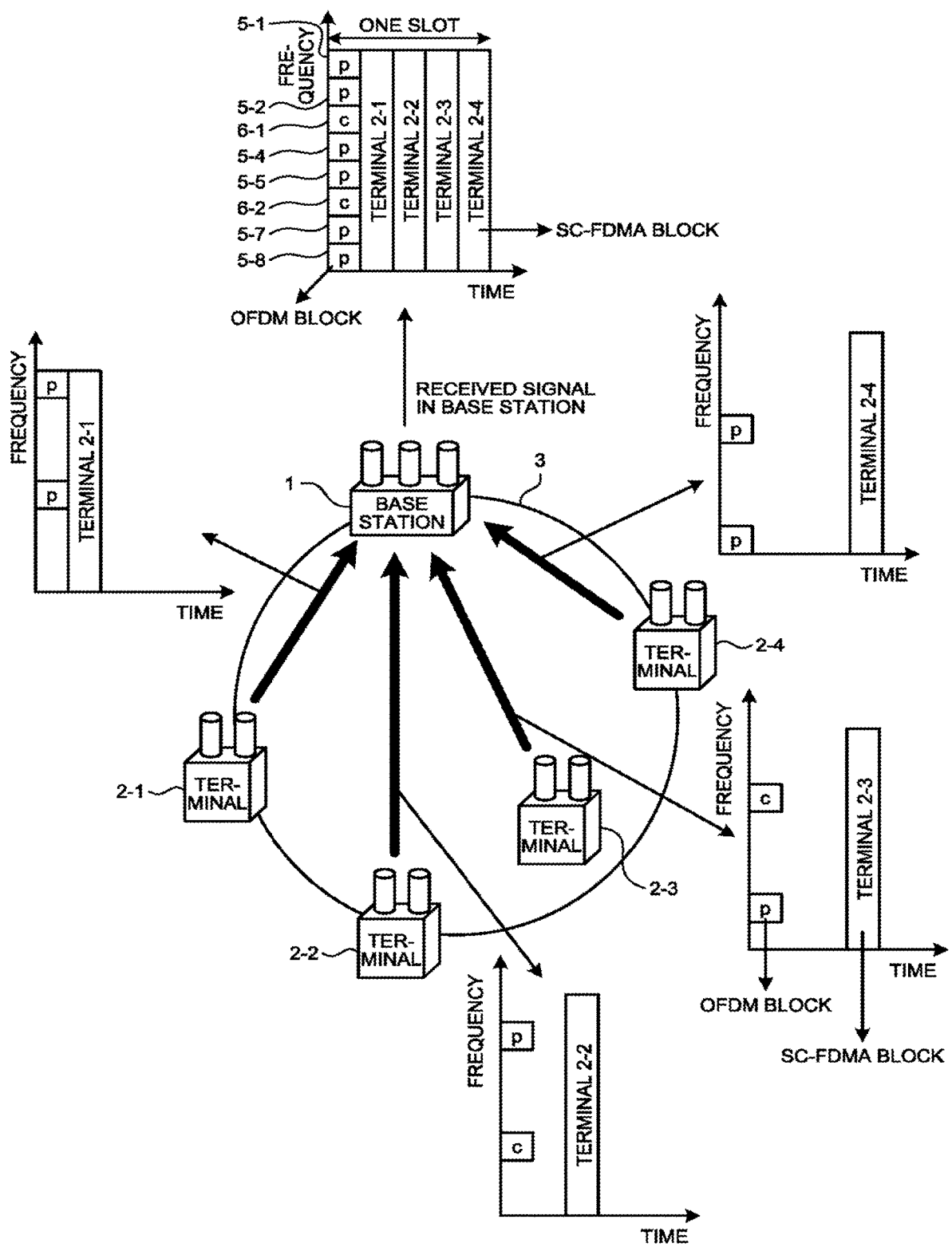
FIG. 8 is a diagram illustrating an example of resource allocation at the time when a control signal is transmitted in an OFDM (Orthogonal Frequency Division Multiple) block in the first embodiment.

FIG. 8 is a diagram illustrating an example of resource allocation at the time when a control signal is transmitted in an OFDM block. In the example illustrated in FIG. 8, the OFDM block is made up of bands 5-1, 5-2, 5-4, 5-5, 5-7, and 5-8 for an RS and bands 6-1 and 6-2 for a control signal. As in the example illustrated in FIG. 7, two bands of the OFDM block are allocated, for an RS, to the terminals 2-1 and 2-4. In the OFDM block, the band 6-2 is allocated, for a control signal, to the terminal 2-2 and the band 5-2 is allocated, for an RS, to the terminal 2-2. In the OFDM block, the band 6-1 is allocated, for a control signal, to the terminal 2-3 and the band 5-7 is allocated, for an RS, to the terminal 2-3.

Figure 9:
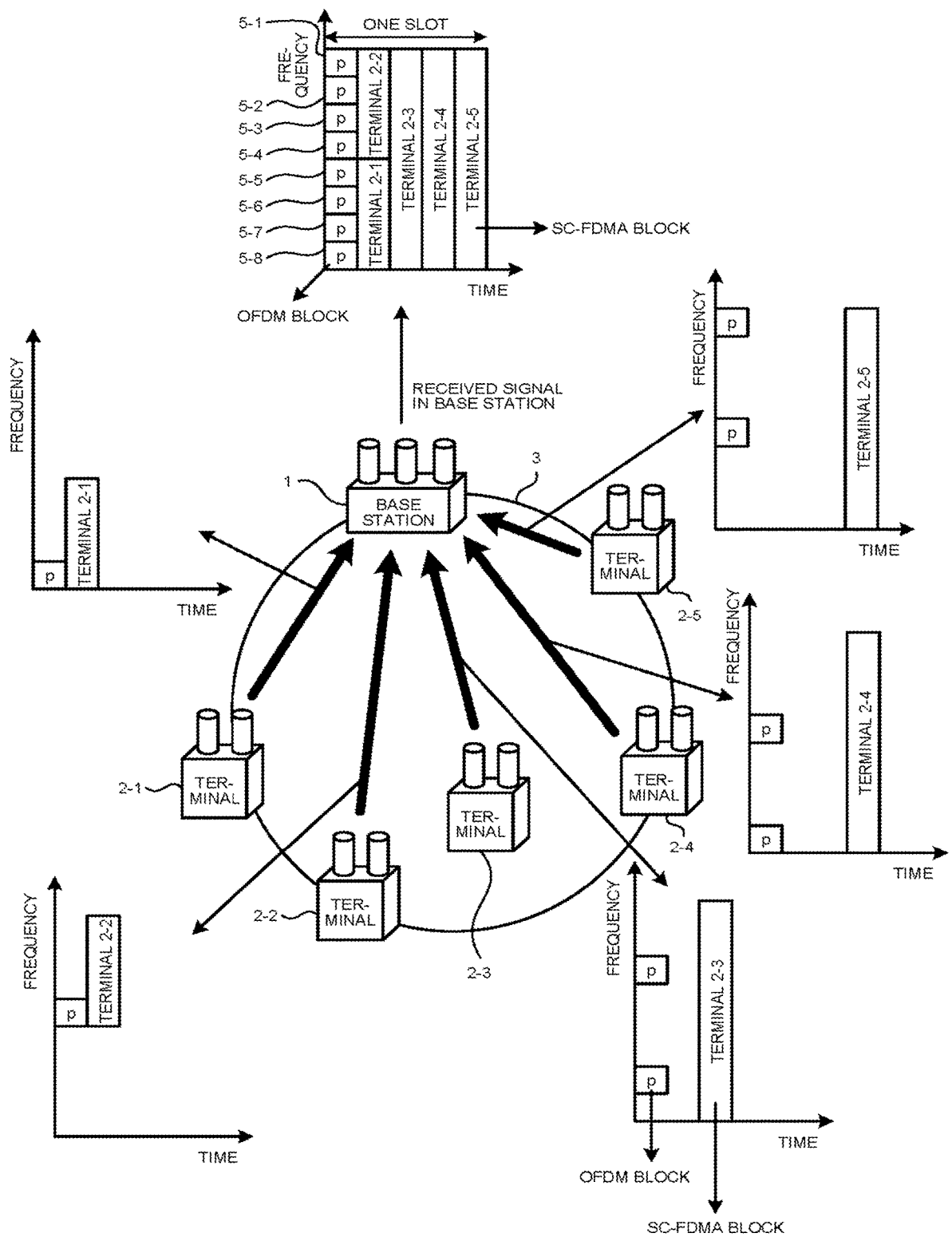
FIG. 9 is a diagram illustrating an example resource allocation at the time when bands obtained by dividing a frequency band used in the SC-FDMA system are allocated to terminals in the first embodiment.

In FIGS. 7 and 8, an example is illustrated in which all the terminals use the same frequency band in the SC-FDMA scheme. However, the frequency band used in the SC-FDMA scheme can be divided into a plurality of frequency bands and it is possible to allocate the divided bands to only some of the terminals. FIG. 9 is a diagram illustrating an example of resource allocation at the time when bands obtained by dividing a frequency band used in the SC-FDMA scheme are allocated to terminals. In the example illustrated in FIG. 9, the base station 1 allocates, to the terminal 2-1, a band having a lower frequency of frequencies obtained by dividing the frequency band used in the SC-FDMA scheme into two frequency bands and allocates a band having a higher frequency to the terminal 2-2. This means that, in an SC-FDMA block that is a second block in a slot, data of the terminal 2-1 and the terminal 2-2 is frequency-multiplexed. In this case, for transmission of an RS, bands in an OFDM block can be allocated as in the example illustrated in FIG. 7. All frequency bands used in the SC-FDMA scheme are allocated to the terminals 2-3 to 2-5. Note that, in FIG. 9, the bands in sequence of the frequency are allocated to the terminals 2-1 and 2-2. However, as described in Non Patent Literature 3, distributed bands in a frequency band used in the SC-FDMA scheme can be allocated to the terminals 2.

Figure 10:
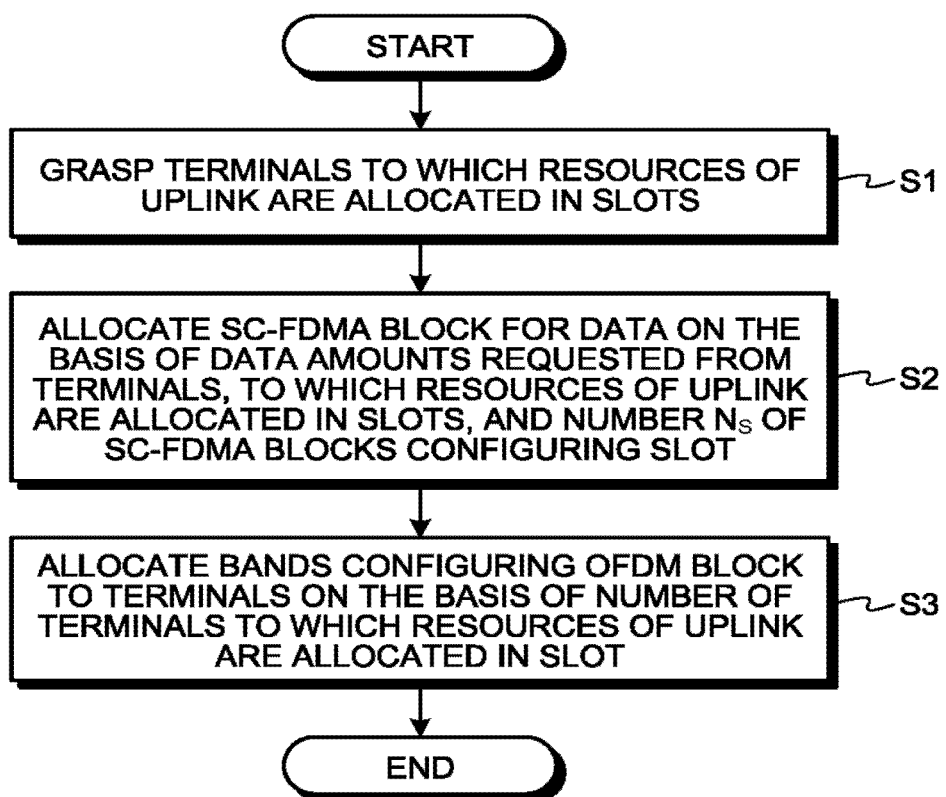
FIG. 10 is a flowchart illustrating an example of a resource allocation processing procedure in a scheduler of the base station in the embodiment.

FIG. 10 is a flowchart illustrating an example of an allocation processing, i.e., a resource allocation processing procedure, performed in the scheduler 15 of the base station 1 in this embodiment. First, the scheduler 15 determines the number of terminals 2 to which resources are allocated in slots (step S1). The number of terminals 2 to which resources are allocated in the slots is acquired from, for example, the beam control unit 12. Note that the number of terminals 2 to which resources are allocated in the slots is calculated on the basis of the positions of the terminals 2 acquired from the terminals 2, the position of the base station 1, and an upper limit value of the number of terminals at which one analog beam can be directed.

For example, when communication is performed with six terminals 2, if the six terminals 2 can be irradiated by one analog beam without performing switching of analog beams, it is possible to generate an analog beam that irradiates the six terminals 2; however, when the upper limit value of the number of terminals at which the one analog beam can be directed is five or less or when the terminal 2 is present outside a range that can be covered by the one analog beam, the base station 1 performs switching of the analog beams. For example, the base station 1 calculates the position of a geometrical center of the positions of the six terminals and determines whether five terminals 2 excluding the terminal 2 most distant from the position can be irradiated by the one analog beam. When the five terminals 2 can be irradiated by the one analog beam, the base station 1 generates an analog beam directed at the five terminals 2 in a certain slot and generates an analog beam directed to the remaining one terminal 2 in the next slot. The beam control unit 12 can carry out the determination and the control or a not-illustrated other control unit or the like can carry out the determination and the control.

Subsequently, the scheduler 15 allocates an SC-FDMA block for data on the basis of the amount of data requested from the terminals 2 determined at step S1, i.e., the terminals to which resources of the uplink are allocated in the slot and the number $N_S$ of SC-FDMA blocks making up one slot (step S2). The scheduler 15 determines the amount of data requested from the terminals 2 on the basis of resource allocation requests from the terminals 2 received through the receiving unit 13. In this case, as illustrated in FIG. 9, data transmitted from the terminals 2 can be frequency-multiplexed in one SC-FDMA block. For example, the base station 1 can decide in advance the terminals 2 functioning as targets of the frequency multiplexing. Alternatively, when a plurality of terminals 2, requested data amounts of which are equal to or smaller than a threshold, are present, the base station 1 can select data on the terminals 2 for frequency multiplexing.

Subsequently, the scheduler allocates bands configuring an OFDM block to the terminals on the basis of the number of terminals 2 to which resources of the uplink are allocated in one slot (step S3). In this case, the scheduler 15 determines the number of bands to be allocated for each of the terminals 2 in allocation units of bands of the OFDM block, for example, resource block units described above. For example, when a frequency band usable as the OFDM block, that is, a frequency band usable in orthogonal frequency division multiplex transmission is divided into $N_R$ resource blocks and the number of terminals 2 to which resources of the uplink are allocated in the slot is $N_{UE}$, the scheduler 15 allocates a maximum integer number of resource blocks equal to or more than $N_R/N_{UE}$ to the terminals 2. Concerning specifically which resource blocks are allocated, for example, the resource blocks can be allocated in order from a resource block having the highest frequency in ascending order of identifiers of the terminals 2 or ascending order of time when the terminals are connected to the base station 1. Any allocation method can be used. As illustrated in FIGS. 7, 8, and 9, when bands in remote two places are allocated, $N_{UE}$ resource blocks can be divided into two groups, that is, a group with a high frequency and a group with a low frequency and bands for an RS can be allocated in the groups. An allocation method for the band for an RS is not limited to these methods. Any method can be used.

As illustrated in FIG. 8, when a band allocated for a control signal in the OFDM block, the scheduler 15 allocates bands in the OFDM block for an RS and for a control signal in the same manner as described above. Note that it can be decided in advance to which terminal 2 a band is allocated for a control signal in the OFDM block. The base station 1 can allocate a band for a control signal in the OFDM block when there is a request from the terminal 2.

As described above, the scheduler 15 carries out the allocation processing described above for allocating a frequency band and a transmission time in a slot, which is a fixed period, to one or more terminals 2. In the allocation processing, the scheduler 15 determines, in the slot, a first transmission period, which is a period in which orthogonal frequency division multiplex transmission is performed, that is, an OFDM bloc, that is, an orthogonal frequency division multiplex transmission period, and a period in which single carrier block transmission is performed, that is an SC-FDMA block. The scheduler is allocates the first transmission period to transmission times for transmission of RSs from one or more terminals 2 and allocates frequency bands for transmission of the RSs in the first transmission period to respective one or more terminals 2 such that e frequency bands do not overlap among the one or more terminals 2. The scheduler 15 allocates, to each of the one or more terminals 2, for transmission of data, the transmission times and the frequency bands in which the single carrier block transmission is performed.

The scheduler 15 carries out the processing described above per slot and notifies allocation information indicating an allocation result of resources of the slots to the transmitting unit 14.

The allocation information is configured by, for example, transmission signal information, which is information indicating a type of a signal indicating whether an allocation result is an allocation result for data, an allocation result for an RS, or an allocation result for a control signal, and resource information indicating a result of allocation to the signal. The resource information is configured by, for example, transmission timing information indicating the position of an allocated block in a slot and in-use band information indicating an allocated band.

Therefore, for example, in the allocation information for data, information indicating that the allocation result is for data is stored as the transmission signal information. In the transmission timing information of the resource information, information indicating a position in a slot of an SC-FDMA block allocated as data to the terminals 2 is stored. In the in-use band information, information indicating a frequency for transmitting the SC-FDMA block is stored. In the allocation information for an RS, information indicating the allocation result is the allocation result for the RS is stored as the transmission signal information. In the transmission timing information of the resource information, information indicating a position in the slot of the OFDM block allocated, for an RS, to the terminals 2 is stored. In the in-use band information, information indicating a band in the OFDM block for transmitting an RS is stored. In the allocation information for a control signal, information indicating that the allocation result is the allocation result for a transmission signal is stored as the transmission signal information. In the transmission timing information of the resource information, information indicating the position in the slot of the OFDM block allocated, for a control signal, to the terminals 2 is stored. In the in-use band information, information indicating a band in the OFDM block for transmitting the control signal is stored.

The transmitting unit 14 transmits the allocation result of the allocation processing, that is, the allocation information to the terminals 2 as control signals. Note that, as described above, the base station 1 can carry out, for each of the slots, the allocation processing of the resources and the notification of the allocation result or can perform the allocation processing of the resources and the notification of the allocation result in units of a plurality of slots.

Figure 11:
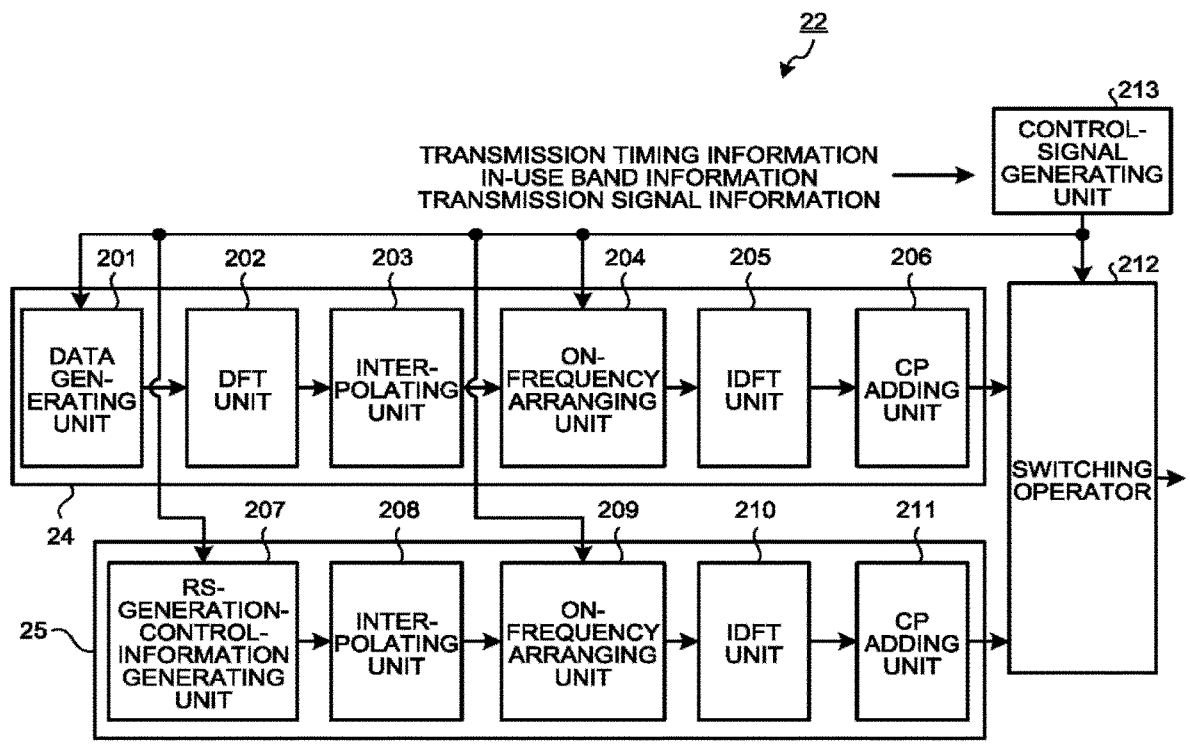
FIG. 11 is a diagram illustrating an example configuration of a transmitting unit of the terminal in the first embodiment.

Details of the configuration and the operation in this embodiment are described. FIG. 11 is a diagram illustrating an example configuration of the transmitting unit 22 of the terminal 2 in this embodiment. As illustrated in FIG. 11, the transmitting unit 22 includes a data generating unit 201, a DFT unit 202, an interpolating unit 203, an on-frequency arranging unit 204, an IDFT unit 205, a CP adding unit 206, an RS-generation-control-information generating unit 207 (a known-signal generating unit), an interpolating unit 208, an on-frequency arranging unit 209, an IDFT unit 210, a CP adding unit 211, and a switching operator 212. The data generating unit 201, the DFT unit 202, the interpolating unit 203, the on-frequency arranging unit 204, the IDFT unit 205, and the CPU adding unit 206 configure a first signal generating unit 24 that generates, on the basis of data, an SC-FDMA signal, that is, a first signal to be transmitted by single carrier block transmission. The RS-generation-control-information generating unit 207, the interpolating unit 208, the on-frequency arranging unit 209, the IDFT unit 210, and the CP adding unit 211 configure a second signal generating unit 25 that generates, on the basis of an RS, which is a known signal, an OFDM signal, that is, a second signal transmitted by orthogonal frequency division multiplex transmission.

The data generating unit 201 generates data. Specifically, the data generating unit 201 generates a data signal obtained by modulating data to be transmitted. For example, the data generating unit 201 generates a PSK signal, which is a signal modulated by PSK (Phase Shift Keying), a QAM signal, which is a signal modulated by QAM (Quadrature Amplitude Modulation), and the like.

The DFT unit 202 applies DFT processing to the data signal output from the data generating unit 201 to thereby convert the data signal into a frequency domain signal and outputs the frequency domain signal. That is, the DFT unit 202 is a time-frequency converting unit that converts data into a frequency domain signal and outputs the frequency domain signal. Note that, instead of the DFT unit 202, any component that converts a signal in a time domain into a signal in a frequency domain can be used. For example, an FFT unit that performs FFT (Fast Discrete Fourier Transform) can be used instead of the DFT unit 202.

The interpolating unit 203 carries out interpolation processing on the frequency domain signal output from the DFT unit 202. In the interpolation processing, the interpolating unit 203 performs over-sampling processing (processing for increasing a sampling rate, that is, making a sampling interval finer) using, for example, a signal interpolation formula described in "B. Porat, "A Course in Digital Signal Processing", John Wiley and Sons Inc., 1997" and performs over-sampling on an input signal such that the number of sampling points per one symbol is L. Note that L is a ratio of a sampling rate after the interpolation processing to a sampling rate before the interpolation, that is, an over-sampling rate. The interpolation processing is, specifically, processing for performing, by the DFT unit 202, zero insertion into a frequency domain signal. That is, the interpolating unit 203 inserts zero up to a portion corresponding to a frequency corresponding to the sampling rate after the interpolation processing. When the frequency domain signal output from the DFT unit 202 has $L\lambda N_{DFT}$ points, the interpolating unit 203 carries out the zero insertion such that a total number of points is $L \times N_{DFT}$. Note that the over-sampling rate in the interpolation processing can be one. That is, the terminal 2 does not have to include the interpolating unit 203.

The on-frequency arranging unit 204 arranges the signal output from the interpolating unit 203 on a frequency axis on the basis of an instruction from the control-signal generating unit 213 and outputs the signal to the IDFT unit 205. The IDFT unit 205 applies IDFT processing to the signal output from the on-frequency arranging unit 204 to thereby convert the signal output from the on-frequency arranging unit 204 into a time domain signal and outputs the time domain signal. That is, the IDFT unit 205 is a first frequency-time conversion unit that converts a frequency domain signal into a time domain signal and outputs the time domain signal. Note that, instead of the IDFT unit 205, any component that converts a signal in a time domain into a signal in a frequency domain can be used. For example, an IFFT unit that performs IFFT can be used instead of the IDFT unit 205.

The CP (Cyclic Prefix) adding unit 206 adds a CP to the signal output from the IDFT unit 205. That is, the CP adding unit 206 is a first CP adding unit that adds a CP to the signal output from the IDFT unit 205 and outputs the signal to the switching operator 212 as a first signal. Specifically, the CP adding unit 206 duplicates last $N_{CP}$ data of the signal output from the IDFT unit 205, adds the duplicated data to the head of the signal output from the IDFT unit 205, and outputs the signal to the switching operator 212. According to the processing described above, the signal generated by the data generating unit 201 is changed to an SC-FDMA signal and input to the switching operator 212.

The RS-generation-control-information generating unit 207 is a known-signal generating unit that generates a known signal. The RS-generation-control-information generating unit 207 generates an RS, which is a known signal, and outputs the RS to the interpolating unit 208. The interpolating unit 208 performs interpolation processing and outputs a signal after the interpolation processing to the on-frequency arranging unit 209. Like the interpolation processing in the interpolating unit 203, the interpolation processing is specifically, for example, zero insertion processing. Note that an over-sampling rate in the interpolation processing can be one. That is, the terminal 2 does not have to include the interpolating unit 208.

The on-frequency arranging unit 209 arranges the signal output from the interpolating unit 208 on a frequency axis on the basis of an instruction from the control-signal generating unit 213 and outputs the signal to the IDFT unit 210. That is, the on-frequency arranging unit 209 arranges the RS on a frequency band allocated for sending the RS therefrom. The IDFT unit 10 applies IDFT processing to the signal output from the on-frequency arranging unit 209 to thereby convert the signal output from the on-frequency arranging unit 209 into a time domain signal and outputs the time domain signal. That is, the IDFT unit 210 is a second frequency-time conversion unit that converts the signal output from the on-frequency arranging unit 209 into a time domain signal. Note that, instead of the IDFT unit 10, any component that converts a signal in a time domain into a signal in a frequency domain can be used. For example, an IFFT unit that performs IFFT can be used instead of the IDFT unit 210.

The CP adding unit 211 adds a CP to the signal output from the IDFT unit 210. That is, the CP adding unit 211 is a second CP adding unit that adds a CP to the signal output from the IDFT unit 210 and outputs the signal to the switching operator 212 as a second signal. Specifically, the CP adding unit 211 duplicates last $N_{CP}$ data of the signal output from the IDFT unit 210, adds the duplicated data to the head of the signal output from the IDFT unit 210, and outputs the signal to the switching operator 212. According to the processing described above, the RS generated by the RS-generation-control-information generating unit 207 is changed to an OFDM signal and input to the switching operator 212.

When a control signal is transmitted in an OFDM block, according to an instruction of the control-signal generating unit 213, the RS-generation-control-information generating unit 207 generates, together with an RS symbol, control information transmitted as a control signal and outputs the control information to the interpolating unit 208. The interpolating unit 208 performs interpolation processing on the RS symbol and the control information. The on-frequency arranging unit 209 arranges, according to an instruction of the control-signal generating unit 213, data corresponding to the RS symbol and data corresponding to the control signal on a frequency axis. That is, the second signal generating unit 25 generates a second signal on the basis of the control signal. The control-signal generating unit 213 controls the second signal generating unit 25 such that, in a first transmission period, the control signal is arranged in a frequency band allocated for transmission of the control signal from the terminal 2 among frequency bands usable in orthogonal frequency division multiplex transmission.

The control-signal generating unit 213 determines transmission timing information, in-use band information, and transmission signal information on the basis of signal received from the base station 1 through the receiving unit 23. The transmission timing information and the in-use band information indicate resources allocated by the base station 1 as described above. The control-signal generating unit 213 indicates in-use band information for data to the on-frequency arranging unit 204, indicates in-use band information for an RS to the on-frequency arranging unit 209, and indicates in-use band information for a control signal to the on-frequency arranging unit 209. On the basis of transmission timing information for data and transmission timing information for an RS, the control-signal generating unit 213 instructs the data generating unit 201 to generate data and instructs the RS-generation-control-information generating unit 207 to generate an RS or an RS and control information. The control-signal generating unit 213 instructs, on the basis of the transmission timing information for data and the transmission timing information for an RS, the switching operator 212 to switch a signal output from the switching operator 212. When resource information for a control signal is notified from the base station 1, the control-signal generating unit 213 instructs the RS-generation-control-information generating unit 207 to generate control information. When the resource information for a control signal is not notified from the base station 1, the control-signal generating unit 213 instructs the data generating unit 201 to generate control information. When being instructed to generate control information from the control-signal generating unit 213, the data generating unit 201 generates control information, modulates the control information, and outputs the control information to the DFT unit 202. The data generating unit 201 can mix both of the control signal and the data and output the control signal and the data to the DFT unit 202.

The control-signal generating unit 213 is control unit that controls the second signal generating unit 25 such that, in the OFDM block which is the first transmission period, an RS is arranged in a frequency band allocated for transmission of the RS from the terminal 2 among frequency bands usable in orthogonal frequency division multiplex transmission.

The switching operator 212 selects, on the basis of an instruction from the control-signal generating unit 213, either one of the SC-FDMA signal output from the CP adding unit 206 and the OFDM signal output from the CP adding unit 211 and outputs the selected signal to the antenna 21. That is, the first signal and the second signal are input to the switching operator 212. In the first transmission period, the switching operator 212 selects and outputs the second signal. In the second period, which is a period allocated for data of the terminal 2 in the SC-FDMA block, the switching operator 212 selects and outputs the first signal. The antenna 21 illustrated in FIG. 3 transmits the signal output from the switching operator 212. The first transmission period is the OFDM block as described above. The second transmission period is a period allocated, to the terminal 2, for transmission of data from the terminal 2 in a third transmission period, which is a period excluding the first transmission period in a slot, which is a fixed period, by the base station 1, which is an apparatus that performs resource allocation to one or more terminals 2 including the terminal 2. Specifically, in the example illustrated in FIG. 7, the first transmission period is a first block in the slot, which is the fixed period. The third transmission period is second to fifth blocks, that is, four SC-FDMA blocks. For example, the second transmission period of the terminal 2-1 is a second block in the slot.

A hardware configuration of the terminal 2 is described. The antenna 21 configuring the terminal 2 illustrated in FIG. 3 is an antenna. The transmitting unit 22 is a transmitter. The receiving unit is a receiver. All of the components configuring the transmitting unit 22 illustrated in FIG. 11 can be configured as processing circuits, which are hardware. A part of all of the components can be realized by software.

Figure 12:
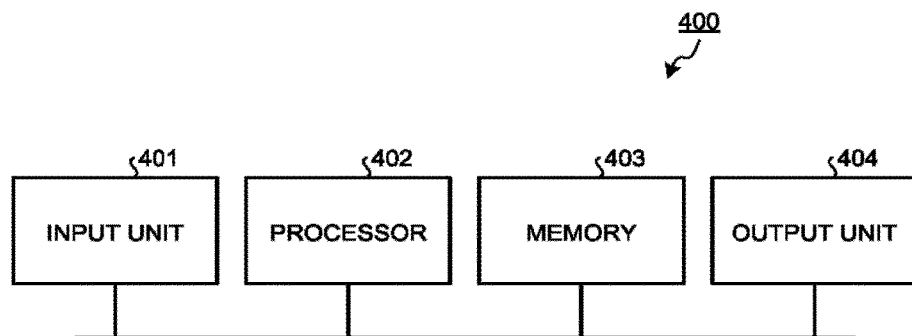
FIG. 12 is a diagram illustrating an example configuration of a control circuit in the first embodiment.

When there are components realized by software among the components illustrated in FIG. 11, the components realized by the software are realized by, for example, a control circuit illustrated in FIG. 12. A control circuit 400 illustrated in FIG. 12 includes an input unit 401, which is a receiving unit that receives data input from the outside, a processor 402, a memory 403, and an output unit 404, which is a transmitting unit that transmits data to the outside. The input unit 401 is an interface circuit that gives the data input from the outside f the control circuit 400 to the processor. The output unit 404 is an interface circuit that sends data from the processor or the memory to the outside of the control circuit 400. When at least a part of the components illustrated in FIG. 11 are realized by the control circuit 400 illustrated in FIG. 12, the components are realized by the processor 402 reading out and executing programs corresponding to each of the components of the transmitting unit 22 stored in the memory 403 and realized by the software. The memory 403 is also used as a temporary memory in respective kinds of processing carried out by the processor 402.

Figure 13:
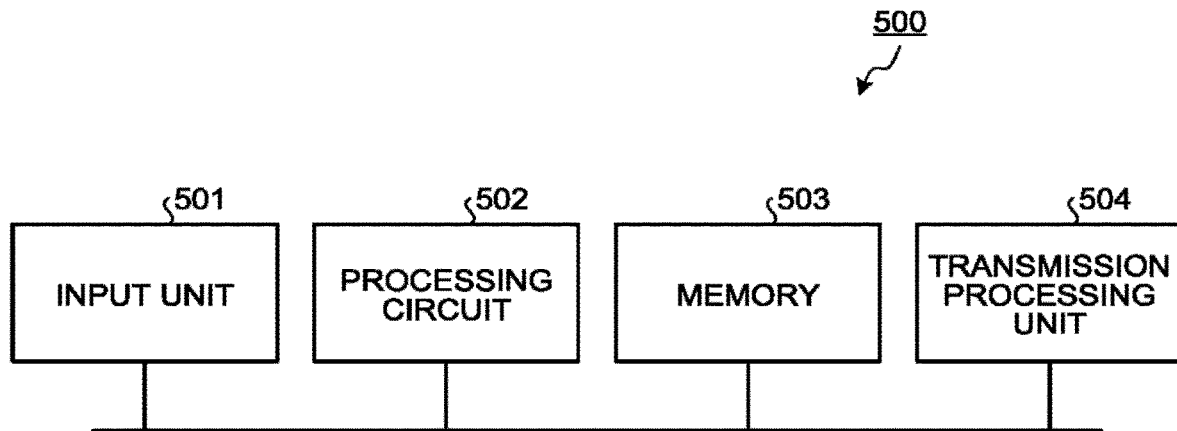
FIG. 13 is a diagram illustrating an example configuration of an electronic circuit in the first embodiment.

When the components illustrated in FIG. 11 are realized as hardware, the components are realized by an electronic circuit 500 illustrated in FIG. 13. As illustrated in FIG. 13, an electronic circuit 500 includes an input unit 501, which is a receiving unit that receives data input from the outside, a processing circuit. 502, a memory 503, and a transmission processing unit 504, which is a transmitting unit that transmits data to the outside. The input unit 501 is an interface circuit that gives the data input from the outside to the processing circuit 502. The transmission processing unit 504 is an interface circuit that sends data from the processing circuit 502 or the memory 503 to the outside. When the components illustrated in FIG. 11 are realized by the electronic circuit 500, the processing circuit 502 includes one or more processing circuits corresponding to each of components. The memory 503 is also used as a temporary memory in respective kinds of processing carried out by the processing circuit 502.

Figure 14:
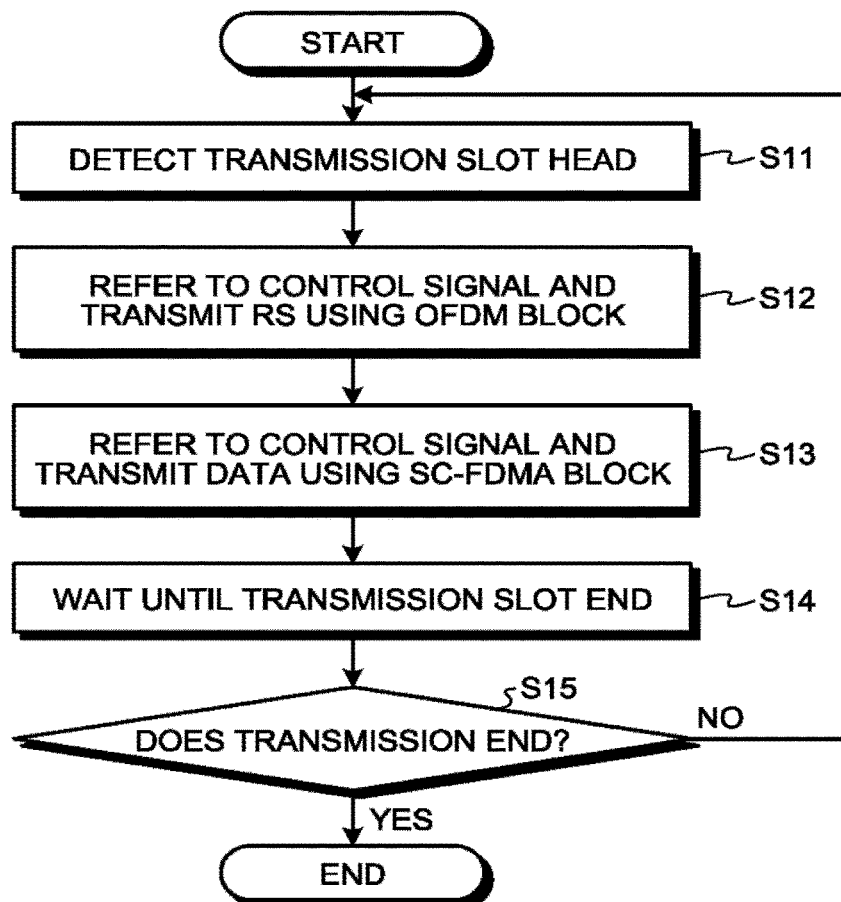
FIG. 14 is a diagram illustrating an example of a transmission processing procedure in the transmitting unit in the first embodiment.

Transmission processing in the transmitting unit 22 is described. FIG. 14 is a diagram illustrating an example of a transmission processing procedure in the transmitting unit 22 in this embodiment. The transmitting unit 22 detects the head of a slot, that is, a transmission slot (step S11). For example, it is assumed that the base station 1 transmits information capable of determining a head position of the transmission slot to the terminal 2 as a control signal. The control-signal generating unit 213 of the terminal 2 calculates time at the transmission slot head on the basis of the information and detects the time as the head of the transmission slot. Note that the receiving unit 23 can receive a signal from the base station 1 and detect timing of the slot and the transmitting unit 22 can detect the head of the transmission slot on the basis of the detection result.

Subsequently, the transmitting unit 22 refers to the control signal received from the base station 1 and transmits an RS using an OFDM block (step S12). Specifically, the control-signal generating unit 213 controls the RS-generation-control-information generating unit 207, the on-frequency arranging unit 209, and the switching unit 212 to determine an allocation result of resources for an RS referring to the control signal received from the base station 1 and transmits an RS on the basis of the allocation result. As described above, the RS-generation-control-information generating unit 207 generates an RS at timing indicated from the control-signal generating unit 213. The generated RS is input to the switching operator 212 through the interpolating unit 208, the on-frequency arranging unit 209, the IDFT unit 210, and the CP adding unit 211. The switching operator 212 transmits, via tie antenna 21, a signal input from the CP adding unit 211 at the timing indicated from the control-signal generating unit 213.

Subsequently, the transmitting unit 22 refers to the control signal received from the base station 1 and transmits data using an SC-FDMA block (step S13). Specifically, the control-signal generating unit 213 controls the data generating unit 201, the on-frequency arranging unit 204, and a switching unit 212 to determine an allocation result of resources for data referring to the control signal received from the base station 1 and transmit data on the basis of the allocation result. As described above, the data generating unit 201 generates data at the timing indicated from the control-signal generating unit 213. The generated data is input to the switching operator 212 through the DFT unit 202, the interpolating unit 203, the on-frequency arranging unit 204, the IDFT unit 205, and the CP adding unit 206. The switching operator 212 transmits, via the antenna 21, a signal input from the CP adding unit 206 at the timing indicated from the control-signal generating unit 213.

Subsequently, the control-signal generating unit 213 of the transmitting unit 22 waits until the end of the transmission slot (step S14) and determines whether the transmission of the data from the terminal 2 ends (step S15). When the transmission of the data from the terminal 2 ends (Yes at step S15), the control-signal generating unit 213 ends the processing. When the transmission of the data from the terminal 2 does not end (No at step S15), the control-signal generating unit 213 returns to step S11 and starts transmission processing of the next transmission slot.

Figure 15:
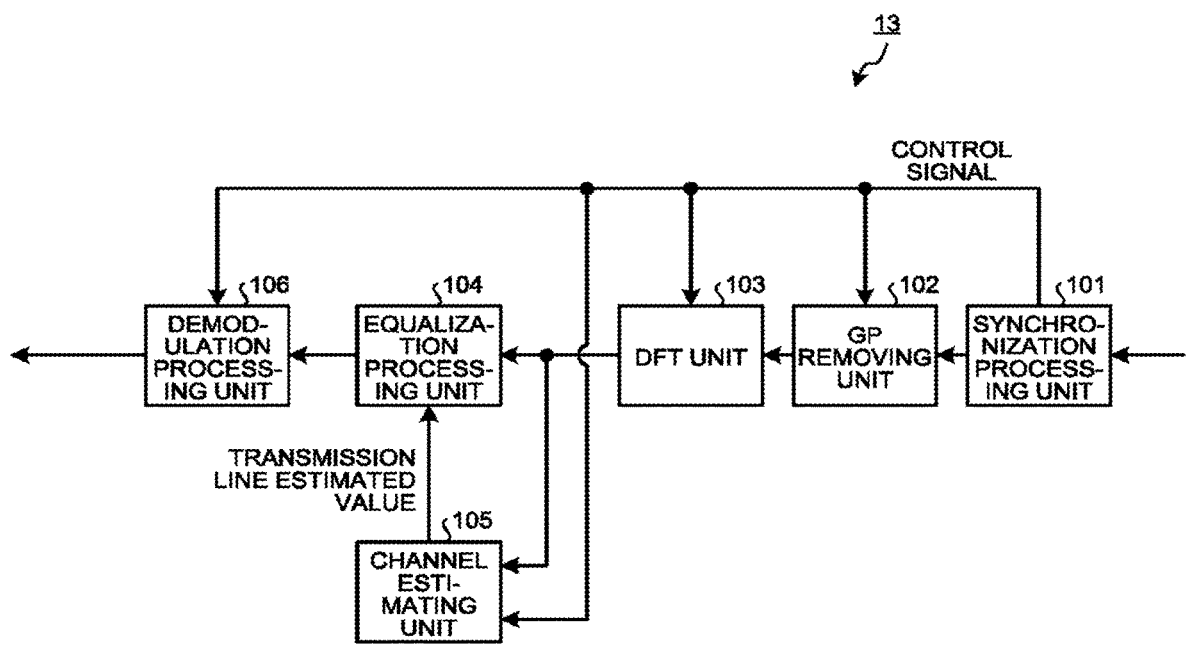
FIG. 15 is a diagram illustrating an example configuration of a receiving unit in the first embodiment.

The configuration and reception processing of the receiving unit 13 of the base station 1 are described. FIG. 15 is a diagram illustrating an example configuration of the receiving unit 13 in this embodiment. As illustrated in FIG. 15, the receiving unit 13 includes a synchronization processing unit 101, a CP removing unit 102, a DFT unit 103, an equalization processing unit 104, a channel estimating unit 105, and a demodulation processing unit 106.

The synchronization processing unit 101 discriminates whether a received signal received via the antenna 11 and the beam control unit 12 is an OFDM signal or an SC-FDMA signal and carries out synchronization processing. The synchronization processing unit 101 inputs a discrimination result concerning whether the received signal is the OFDM signal or the SC-FDMA signal to the CP removing unit 102, the DFT unit 103, the channel estimating unit 105, and the demodulation processing unit 106. Further, the synchronization processing unit 101 determines, on the basis of the allocation result of the resources acquired from the scheduler 15, correspondence between a frequency band of the OFDM signal and the allocated terminal 2 and notifies the correspondence to the channel estimating unit 105. When a control signal is also transmitted by the OFDM signal, the synchronization processing unit 101 includes, in the correspondence, information indicating whether the control signal for each of bands is an RS. The CP removing unit 102 removes a CP on the basis of the discrimination result input from the synchronization processing unit 101. When the discrimination result is the OFDM signal, the CP removing unit 102 removes a CP added to the OFDM signal. When the discrimination result is the SC-FDMA signal, the CP removing unit 102 removes a CP added to the SC-FDMA signal. Note that it is assumed that the numbers of CPs respectively added to the OFDM signal and the SC-FDMA signal are decided in advance.

The DFT unit 103 applies the FFT processing to the signal, from which the CP is removed by the CP removing unit 102, to thereby convert the signal, from which the CP is removed by the CP removing unit 102, into a frequency domain signal and inputs the frequency domain signal to the channel estimating unit 105 and the equalization processing unit 104. When zero insertion is performed as the interpolation processing in the terminal 2, the DFT unit 103 carries out processing opposite to the zero insertion, that is, processing for deleting a portion into which zero is inserted. A position of the zero insertion and the number of zero insertions are sometimes different in the OFDM signal and the SC-FDMA signal. Therefore, the DFT unit 103 carries out the processing opposite to the zero insertion according to the input discrimination result. The channel estimating unit 105 carries out channel estimation processing on the basis of the input signal. The channel estimation processing is processing for calculating a channel estimated value, which is an impulse response in a channel. The channel estimation processing can be carried out in a frequency domain. When the channel estimation is performed using an RS, the channel estimating unit 105 associates the SC-FDMA signal and an RS transmitted from a terminal at a transmission source of the SC-FDMA signal, performs the channel estimation, and outputs a channel estimated value to the equalization processing unit 104.

The equalization processing unit 104 carries out equalization processing in a frequency domain on the basis of the channel estimated value obtained by the channel estimating unit 105 and the signal input from the DFT unit 103. Note that the equalization processing in the frequency domain is processing use for distortion correction in the frequency domain. Any method such as equalization processing of a minimum mean squared error (MMSE) paradigm can be use. For example, a method described in Non Patent Literature 1 can be used.

The demodulation processing unit 106 demodulates the signal after the equalization processing. When the discrimination result input from the synchronization processing unit 101 is the SC-FDMA signal, the demodulation processing unit 106 performs the demodulation after the IDFT processing is carried out on the signal after the equalization processing.

A hardware configuration of the base station 1 is described. The antenna 11 configuring the base station 1 illustrated in FIG. 2 is an antenna, the transmitting unit 14 configuring the base station 1 is a transmitter, and the receiving unit 13 configuring the base station 1 is receiver. All of the components configuring the beam control unit 12 and the receiving unit 13 illustrated in FIG. 15 can be configured as processing circuits, which are hardware. A part or all of the components can be realized by software.

When there are components realized by software among the components configuring the beam control unit 12 and the receiving unit 13 illustrated in FIG. 15, the components realized by the software are realized by, for example, the control circuit 400 illustrated in FIG. 12. When at least a part of the components configuring the beam control unit 12 and the receiving unit 13 illustrated in FIG. 15 are realized by software, the components are realized by the processor 402 reading out and executing programs corresponding to the components stored in the memory 403. The memory 403 is also used as a temporary memory in respective kinds of processing carried out by the processor 402.

Figure 16:
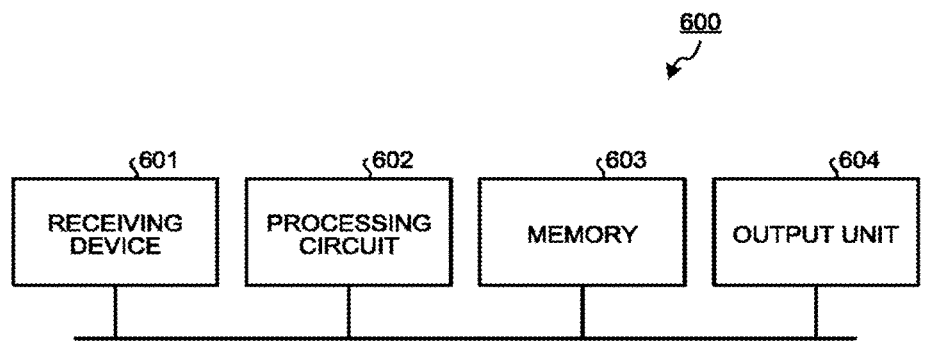
FIG. 16 is a diagram illustrating an example configuration of an electronic circuit in the first embodiment.

When the components of the beam control unit 12 and the receiving unit 13 illustrated in FIG. 15 are realized as hardware, the components are realized by, for example, an electronic circuit 600 illustrated in FIG. 16. As illustrated in FIG. 16, the electronic circuit 600 includes a receiving device 601, which is a receiving unit that receives data input from the outside, a processing circuit 602, a memory 603, and an output unit 604, which is a transmitting unit that transmits data to the outside. The receiving device 601 is an interface circuit that gives the data input from the outside to the processing circuit 602. The output unit 604 is an interface circuit that sends data received from the processing circuit 602 or the memory 603 to the outside. When there are components realized by the electronic circuit 600, the processing circuit 602 includes one or more processing circuits corresponding to each of the components. The memory 603 is also used as a temporary memory in respective kinds of processing carried out by the processing circuit 602.

Figure 17:
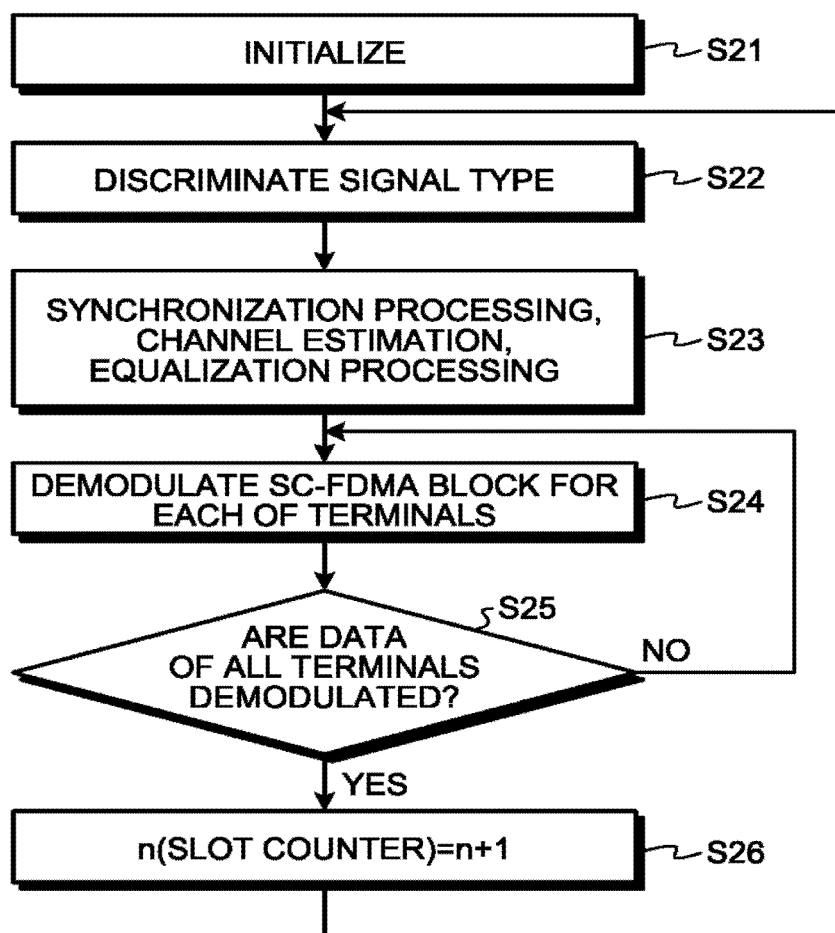
FIG. 17 is a flowchart illustrating an example of a reception processing procedure in the receiving unit of the base station in the first embodiment.

FIG. 17 is a flowchart illustrating an example of a reception processing procedure in the receiving unit 13 of the base station 1 in this embodiment. The receiving unit 13 sets a value of n, which is a slot counter, to an initial value, that is, initializes n (step S21). The initial value is, for example, zero. Specifically, the synchronization processing unit 101 initializes the value of n.

Subsequently, the synchronization processing unit 101 of the receiving unit 13 acquires an allocation result of resources for each of slots from the scheduler 15 and discriminates, on the basis of the allocation result, whether a signal received through the antenna 11 and the beam control unit 12 is an OFDM signal or an SC-FDMA signal, that is, discriminates a signal type and outputs the OFDM signal (step S22). After the discrimination processing, the receiving unit 13 carries out the synchronization processing and performs the channel estimation and the equalization processing (step S23). Specifically, the synchronization processing unit 101 carries out the synchronization processing, the channel estimating unit 105 performs the channel estimation, and the equalization processing unit 104 performs the equalisation processing.

Subsequently, the demodulation processing unit 106 of the receiving unit 13 demodulates the SC-FDMA signal for each of the terminals 2 (step S24). Subsequently, the demodulation processing unit 106 determines whether the demodulation of all the terminals 2 that perform transmission in the slot is performed (step S25). When the demodulation of all the terminals that perform the transmission in the slot is performed (Yes at step S25), the demodulation processing unit 106 updates the value of n, which is the slot counter, to n+1 (step S26) and returns to step S22. When there is the terminal 2 for which the demodulation of data is not performed among the terminals 2 that perform the transmission in the slot (No at step S25), the demodulation processing unit 106 changes the terminal 2 set as a processing target and carries cut step S24.

Beam control processing in the beam control unit 12 is described. The beam control processing is processing for multiplying a matrix called precoding matrix to thereby generate an analog beam. The precoding matrix is a matrix for calculating antenna weight to increase a beam output in, for example, a desired direction, that is, a direction in which the terminal 2 is present and reduce outputs in directions other than the desired direction. As beam control in which such a precoding matrix is used, for example, a block diagonalization method can be used. The beam control processing is not limited to this and any method can be used.

Note that the method of realizing transmission reflecting the allocation procedure of resources in the base station 1, the notification method of the allocated resources to the terminal 2, and the allocation result of the resources notified from the base station 1 in the terminal 2 is an example. The method is not limited to the example described above and any method can be used as long as the terminal 2 can transmit an RS with an OFDM block and transmit data in an SC-FDMA block as illustrated in FIGS. 7 to 9.

In this embodiment, the terminal 2 includes one antenna. However, the terminal 2 can include a plurality of antennas.

As described above, in this embodiment, the OFDM block is provided in the slot used for the transmission from the terminal 2. The terminal 2 transmits the RS in the OFDM block and transmits the data in the SC-FDMA block. Therefore, it is possible to transmit RSs from a plurality of terminals 2 while suppressing deterioration in transmission efficiency.

Second Embodiment

Figure 18:
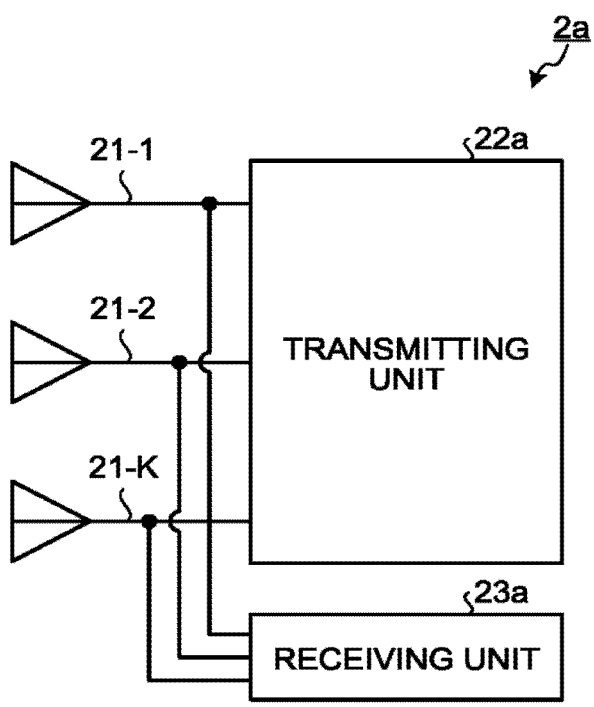
FIG. 18 is a diagram illustrating an example configuration of a terminal in the second embodiment.

FIG. 18 is a diagram illustrating an example configuration of a terminal 2a in a second embodiment of the present invention. The configuration of communication system in this embodiment is the same as the configuration of the communication system in the first embodiment except that the terminal 2 in the first embodiment is replaced with the terminal 2a. The configuration of the base station 1 is the same as the configuration in the first embodiment. The operation of the base station 1 is the same as the operation in the first embodiment except that the equalization processing unit 104 performs post-coding processing described below. Differences from the first embodiment are described below.

As illustrated in FIG. 18, the terminal 2a includes antennas 21-1 to 21-K, a transmitting unit 22a, and a receiving unit 23a. K is an integer equal to or larger than 2. The receiving unit 23a is a receiver that performs reception processing on a signal received by at least one of the antennas 21-1 to 21-K. Note that the terminal 2a can include a reception antenna separately from the antennas 21-1 to 21-K. The receiving unit 23a can perform the reception processing on a signal received by the reception antenna. When signals are received by a plurality of antennas 21-1 to 21-K among the antennas 21-1 to 21-K, the receiving unit 23a can select one of the antennas 21-1 to 21-K that receive the signals and perform the reception processing on the signal received by the selected antenna or can combine the signals received by the antennas 21-1 to 21-K.

Figure 19:
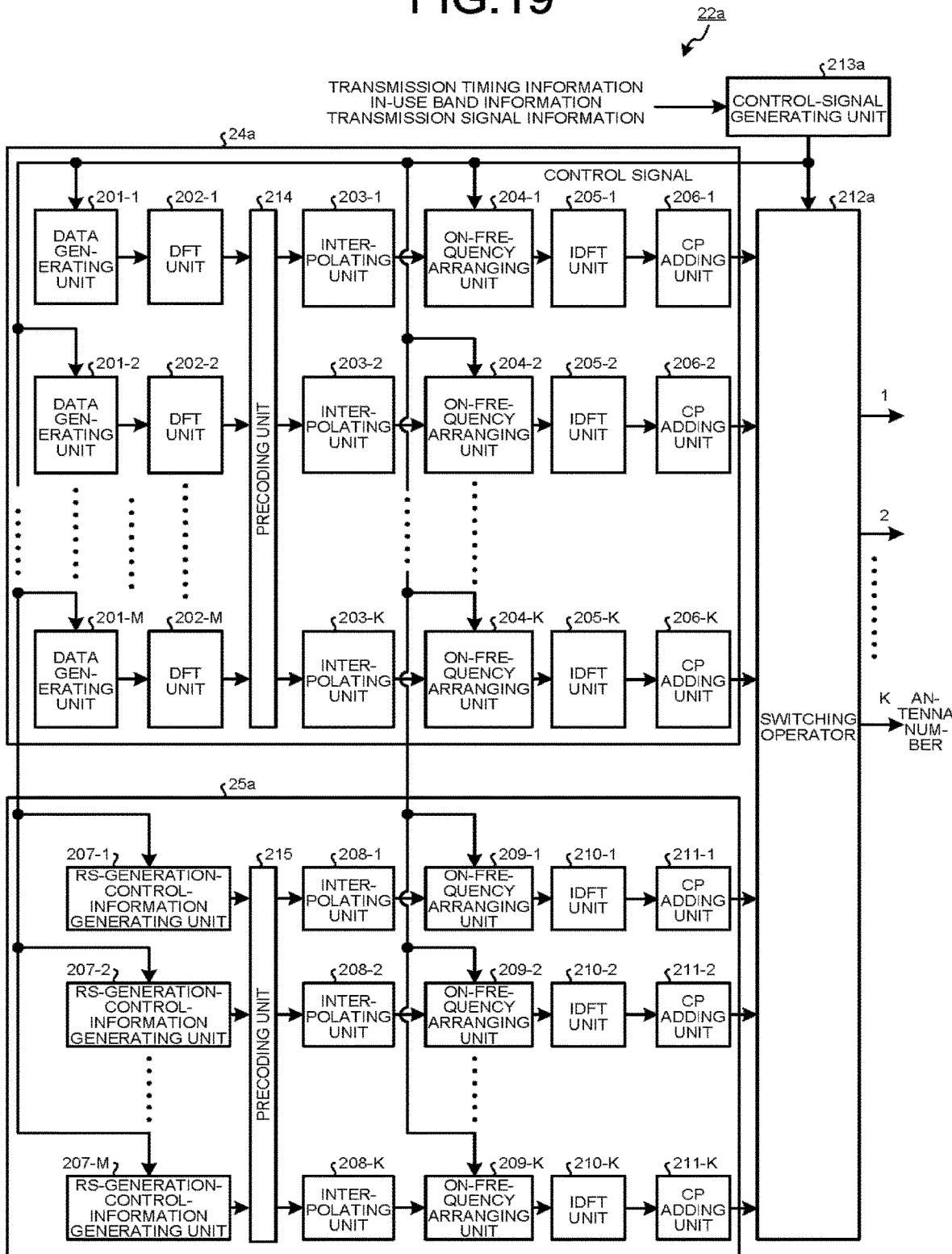
FIG. 19 is a diagram illustrating an example configuration of a transmitting unit of the terminal in the second embodiment.

FIG. 19 is a diagram illustrating an example configuration of the transmitting unit of the terminal 2a in this embodiment. As illustrated in FIG. 19, the transmitting unit 22a includes data generating units 201-1 to 201-M, DFT units 202-1 to 202-M, a precoding unit 214, interpolating units 203-1 to 203-K, on-frequency arranging units 204-1 to 204-K, IDFT units 205-1 to 205-K, CP adding units 206-1 to 206-K, RS-generation-control-information generating units 207-1 to 207-M (known-signal generating units), a precoding unit 215, interpolating units 208-1 to 208-K, on-frequency arranging units 209-1 to 209-K, IDFT units 210-1 to 210-K, CP adding units 211 to 211-K, a switching operator 212a, and a control-signal generating unit 213a. M is an integer equal to or larger than 2.

The data generating units 201-1 to 201-M, the DFT units 202-1 to 202-M, the precoding unit 214, the interpolating units 203-1 to 203-K, the on-frequency arranging units 204-1 to 204-K, the IDFT units 205-1 to 205-K, and the CP adding units 206-1 to 206-K configure a first signal generating unit 24a that generates, on the basis of data, an SC-FDMA signal, that is, a first signal transmitted by single carrier block transfer. The RS-generation-control-information generating units 207-1 to 207-M, the precoding unit 215, the interpolating units 208-1 to 208-K, the on-frequency arranging units 209-1 to 209-K, the IDFT units 210-1 to 210-K, and the CP adding units 211-1 to 211-K configure a second signal generating unit 25a that generates, on the basis of an RS, which is a known signal, an OFDM signal, that is, a second signal transmitted by orthogonal frequency division multiplex transmission.

In the first embodiment, the example is described in which the terminals 2 transmit one stream. However, the terminal 2a in this embodiment performs multi-stream transmission for performing transmission of M streams. The stream is a unit of generation of a transmission signal. For example, a modulation scheme or the like can be changed for each of the streams. In the following description, a signal generated by a data generating unit 201-m (m=1, 2, . . . , and M) and subjected to DFT processing by a DFT unit 202-m is referred to as signal of an m-th stream as appropriate.

Figure 20:
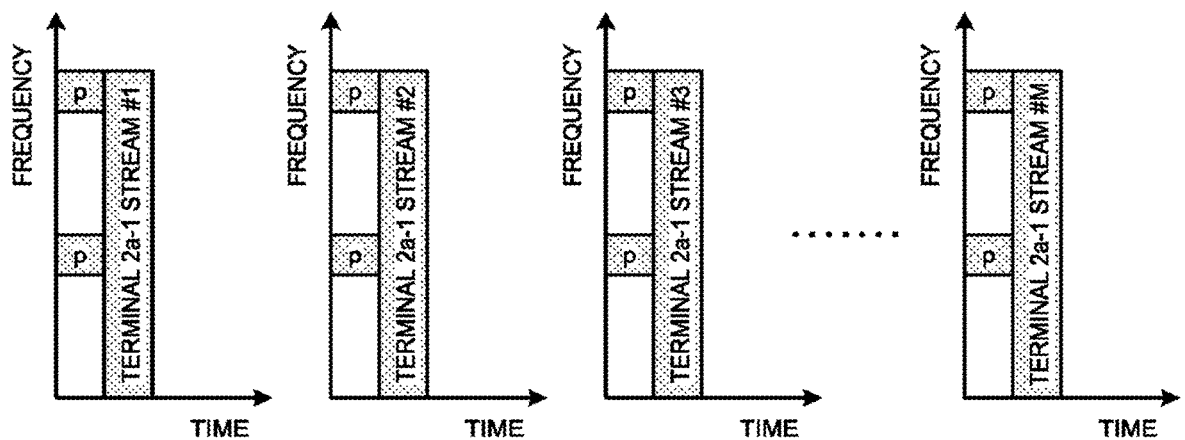
FIG. 20 is a diagram illustrating an example of multistream transmission in a comparative example.

FIG. 20 is a diagram illustrating an example of the multi-stream transmission in this embodiment. As in the first embodiment, the scheduler 15 in the base station 1 provides an OFDM block in a slot and allocates, for an RS symbol, a band of the OFDM block. In the example illustrated in FIG. 20, a first block of the slot is set as an OFDM block. An SC-FDMA block, which is a second block of the slot, is allocated to a terminal 2a-1, which is one of the terminals 2a in this embodiment. The terminal 2a-1 transmits data in the SC-FDMA allocated to the terminal 2a-1. At this point, as illustrated in FIG. 20, the terminal 2a-1 carries out precoding processing on signals of a plurality of streams and transmits the signals from a plurality of antennas. Consequently, it is possible to spatially multiplex the signals of the streams using the same time and the same frequency resource.

Referring back to FIG. 19, the data generating units 201-1 to 201-M generate data signals obtained by modulating data of streams transmitted by the data generating units 201-1 to 201-M. For example, the data generating units 201-1 to 201-M generate PSK signals, which are signals modulated by PSK, QAM signals, which are signals modulated by QAM, and the like. The data signals generated by the data generating units 201-1 to 201-M can be different from one another or can be the same.

The DFT units 202-1 to 202-M respectively apply the DFT processing to the data signals respectively output from the data generating units 201-1 to 201-M to thereby convert the data signals into frequency domain signals and output the frequency domain signals.

The precoding unit 214 multiplies the signals output from the DFT units 202-1 to 202-M with a precoding matrix. Specifically, the precoding unit 214 carries out processing described below. The number of output points of the DFT processing applied by the DFT units 202-1 to 202-M is represented as N. That is, it is assumed that the DFT units 202-1 to 202-M respectively carry out N-point DFT processing. The precoding unit 214 represents, as $s_{m,n}$, n-th data among data of N points of a signal output from the DFT unit 202-*m*, that is, a signal of an m-th stream. K represents the number of antennas of the terminal 2*a* as described above and $z_{k,n}$ is a signal transmitted from a k (k=1, 2, . . . , and N)-th antenna and is n (n=1, 2, . . . , N)-th data output to the interpolating unit 203-*k*. P(bold face)$_n$ is a precoding matrix having a size of K×M. In this case, precoding processing performed by the precoding unit 214 can be represented by the following Expression (1).

[Math 1]

$$\begin{bmatrix} z_{1,n} \\ \vdots \\ z_{K-1,n} \\ z_{K,n} \end{bmatrix} = P_n \begin{bmatrix} s_{1,n} \\ \vdots \\ s_{M-1,n} \\ s_{M,n} \end{bmatrix} \quad (1)$$

P(bold face)$_n$ can be different for each n. In the expression, n is an index of a frequency. Therefore, when frequency selectivity is present in a channel characteristic, it is necessary to change P(bold face)$_n$ for each n. P(bold face)$_n$ can be, for example, decided in advance or can be changed on the basis of a channel estimated value between the terminal 2*a* and the base station 1. In this case, for example, the channel estimated value between the terminal 2*a* and the base station 1 can be calculated on the basis of a signal received by the base station 1 from the terminal 2*a*. Therefore, the channel estimated value is acquired from the base station 1. As described above, the precoding unit 214 is a first precoding unit that carries out first precoding processing for converting M frequency domain signals output from the PET units 202-1 to 202-M into K signals respectively corresponding to the antennas 21-1 to 21-K.

The interpolating units 203-1 to 203-K respectively carry out interpolation processing on a signal output from the precoding unit 214. The interpolation processing is the same as the interpolation processing in the interpolating unit 203 in the first embodiment and is, for example, zero insertion processing.

The on-frequency arranging units 204-1 to 204-K respectively arrange, on the basis of an instruction from the control-signal generating unit 213*a*, signals output from the interpolating units 203-1 to 203-K on a frequency axis and output the signals to the IDFT units 205-1 to 205-K.

The IDFT units 205-1 to 205-K apply IDFT processing to the signals respectively output from the on-frequency arranging units 204-1 to 204-K to thereby convert the signals output from the on-frequency arranging units 204-1 to 204-K into time domain signals and output the time domain signals.

The CP adding units 206-1 to 206-K add CPs respectively to the signals output from the IDFT units 205-1 to 205-K and output the signals to the switching operator 212*a*. According to the processing described above, the signals generated by the data generating units 206-1 to 206-K are respectively changed to SC-FDMA signals and input to the switching operator 212*a*.

The RS-generation-control-information generating units 207-1 to 207-M generate RS symbols and output the RS symbols to the precoding unit 215. The RS symbols generated by the RS-generation-control-information generating units 207-1 to 207-M can be the same or can be different from one another. When the RS symbols are different for each of the streams, the base station 1 needs to learn which RS symbol is transmitted in the channel estimation processing. Therefore, it is assumed that which RS symbol is transmitted for each of the streams is set in the base station 1.

The precoding unit 215 carries out precoding processing on the signals output from the RS-generation-control-information generating units 207-1 to 207-M and outputs the signals to the interpolating units 208-1 to 208-K. The precoding processing performed by the precoding unit 215 is the same as the precoding processing carried out by the precoding unit 214. The precoding unit 215 is a second precoding unit that carries out second precoding processing for converting M known signals output from the RS-generation-control-information generating units 207-1 to 207-M into K signals respectively corresponding to the antennas 21-1 to 21-K.

The interpolating units 208-1 to 208-K perform interpolation processing and output the signals after the interpolation processing to the on-frequency arranging units 209-1 to 209-K. The interpolation processing performed by the interpolating units 208-1 to 208-K is the same as the interpolation processing in the interpolating units 203-1 to 203-K and is, for example, zero insertion processing. The on-frequency arranging units 209-1 to 209-K arrange, on the basis of an instruction from the control-signal generating unit 213*a*, the signals output from the interpolating units 208-1 to 208-K respectively on a frequency axis and output the signals to the IDFT units 210-1 to 210-K.

The IDFT units 210-1 to 210-K apply IDFT processing to the signals output from the on-frequency arranging units 209-1 to 209-K to thereby convert the signals output from the on-frequency arranging units 209-1 to 209-K into time domain signals and output the time domain signals.

The CP adding units 211-1 to 211-K respectively add CPs to the signals output from the IDFT units 210-1 to 210-K. According to the processing described above, the RS symbols generated by the RS-generation-control-information generating units 207-1 to 207-M are changed to OFDM signals and input to the switching operator 212*a*. When a control signal is transmitted in an OFDM block, according to an instruction from the control-signal generating unit 213*a*, the RS-generation-control-information generating units 207-1 to 207-M generate, together with the RS symbols, control information transmitted as control signals and output the control information to the interpolating units 208-1 to 208-K. The interpolating units 208-1 to 208-K perform the interpolation processing on the RS symbols and the control information. The on-frequency arranging units 209-1 to 209-K arrange, according to an instruction of the control-signal generating unit 213, data corresponding to the RS and data corresponding to the control information on a frequency axis. That is, the on-frequency arranging units 209-1 to 209-K arrange the signals after the second precoding processing on a frequency axis allocated for transmission of the RS from the terminal 2*a*.

As in the first embodiment, the control-signal generating unit 213*a* determines, on the basis of a signal received from the base station 1 through the receiving unit 13, transmission timing information, in-use band information, and transmission signal information. The transmission timing information and the in-use band information indicate resources allocated by the base station 1 as described above. The control-signal generating unit 213*a* indicates in-use band information for data to the on-frequency arranging units 204-1 to 204-K, indicates in-use band information for an RS to the on-frequency arranging units 209-1 to 209-K, and indicates in-use band information for a control signal to the on-frequency arranging units 209-1 to 209-K. On the basis of transmission timing information for data and transmission timing information for an RS, the control-signal generating unit 213a instructs the data generating units 201-1 to 201-M to generate data and instructs the RS-generation-control-information generating units 207-1 to 207-M to generate RSs or RSs and control information.

The control-signal generating unit 213a is a control unit that controls the second signal generating unit 25a such that, in the OFDM block, that is, the first transmission period, an RS is arranged in a frequency band allocated for transmission of the RS from the terminal 2a among frequency bands usable in orthogonal frequency division multiplex transmission.

The control-signal generating unit 213 instructs, on the basis of the transmission timing information for data and the transmission timing information for an RS, switching of a signal output to the switching operator 212a. When resource information for a control signal is notified from the base station 1, the control-signal generating unit 213a instructs the RS-generation-control-information generating units 207-1 to 207-M to generate control information. When the resource information for a control signal is not notified from the base station 1, the control-signal generating unit 213a instructs the data generating units 201-1 to 201-M to generate control information. When being instructed to generate control information by the control-signal generating unit 213, the data generating units 201-1 to 201-M generate control information, modulate the control information, and output the control information the DFT units 202-1 to 202-M. The data generating units 201-1 to 201-M can mix both of the control signal and the data and output the control signal and the data to the DFT units 202-1 to 202-M.

The switching operator 212a selects, on the basis of an instruction from the control-signal generating unit 213a, either one of the SC-FDMA signals output from the CP adding units 206-1 to 206-K and the OFDM signals output from the CP adding units 211-1 to 211-K and outputs the signals respectively to the antennas 21-1 to 21-K. That is, the switching operator 212a receives inputs of the first signal and the second signal, selects and outputs the second signal in the first transmission period, and selects and outputs the first signal in the second transmission period, which is a period allocated for data of the terminal 2a among the SC-FDMA blocks. The antennas 21-1 to 21-K illustrated in FIG. 18 transmit the signal output from the switching operator 212a.

As described above, the precoding processing is applied by the transmitting unit 22a to the data and the RS to be transmitted. In precoding matrixes in the respective kinds of precoding processing can be different in data and RSs. In this embodiment, signals of a plurality of streams are spatially multiplexed and transmitted using the same time and the same frequency resource.

All of the components configuring the transmitting unit 22a illustrated in FIG. 19 can be configured as processing circuits, which are hardware. A part or all of the components can be realized by software.

When there are components realized by software among the components illustrated in FIG. 19, the components realized by the software are realized by, for example, the control circuit 400 illustrated in FIG. 12. When there are components realized by software among the components illustrated in FIG. 19, the components are realized by the processor 402 reading out and executing programs stored in the memory 403 and corresponding to each of the components of the transmitting unit 22a realized by the software.

The memory 403 is also used as a temporary memory in respective kinds of processing carried out by the processor 402.

When the components illustrated in FIG. 19 are realized as hardware, the components are realized by the electronic circuit 500 illustrated in FIG. 13. When the components illustrated in FIG. 19 are realized by the electronic circuit 500, the processing circuit 502 includes one or more processing circuits corresponding to each of the components. The memory 503 is also used as a temporary memory in respective kinds of processing carried out by the processing circuit 502.

The operation of the base station 1 is the same as the operation in the first embodiment except the equalization processing unit 104 carries out post-coding processing. The post-coding processing is processing for multiplexing a received signal with a post-coding matrix Q(bold face)$_n$. The post-coding matrix Q(bold face)$_n$ is decided such that, when the preceding matrix described above is represented as P(bold face)$_n$ and the channel matrix is represented as H(bold face)$_n$, for example, P(bold face)$_n$H(bold face)$_n$Q(bold face)$_n$ is a block diagonal matrix.

As described above, in this embodiment, when the terminal 2a spatially multiplexes and transmits the signals of the streams through the precoding processing, as in the first embodiment, the RS is transmitted in the OFDM block. Therefore, the same effects as the effects in the first embodiment are obtained. Further, it is possible to spatially multiplex and transmit the signals of the streams using the same time and the same frequency resource.

Third Embodiment

Figure 21:
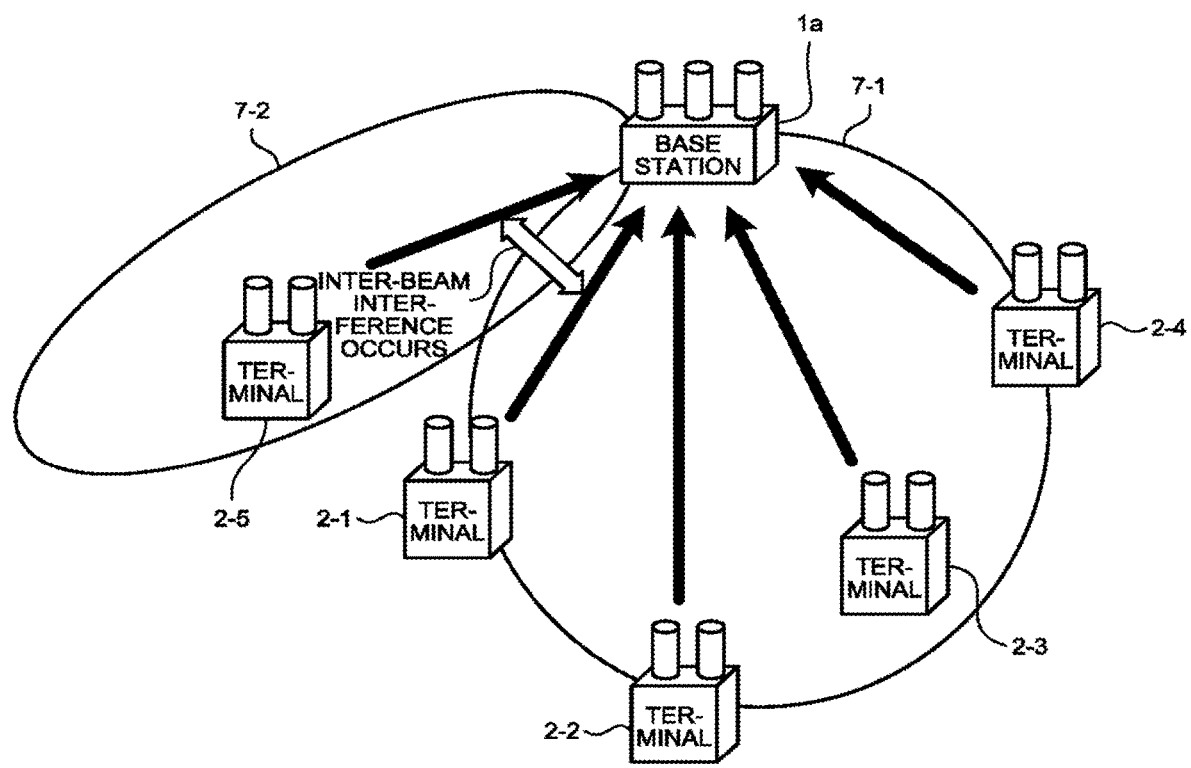
FIG. 21 is a diagram illustrating an example configuration of a communication system in a third embodiment.

FIG. 21 is a diagram illustrating an example configuration of a communication system in a third embodiment of the present invention. As illustrated in FIG. 21, the communication system in this embodiment is configured by a base station 1a and the terminals 2-1 to 2-5. The terminals to 2-5 are the same as the terminals 2 in the first embodiment. In the following description, differences from the first embodiment are described. Redundant description of the first embodiment is omitted.

Like the base station 1 in the first embodiment, the base station 1a generates an analog beam. The base station 1a is capable of simultaneously generating a plurality of analog beams. When a plurality of terminals 2 are present in the same analog beam, as described in the first embodiment, resources are allocated to the terminals 2 such that at least one of a time and a frequency of a slot is different in an uplink. On the other hand, when a first analog beam and a second analog beam, which are analog beams simultaneously generated by the base station 1, are transmitted to be adjacent to each other, if resource allocation of a slot is performed in analog beam units, it is likely that a signal transmitted by the terminal 2, which is a target of irradiation of a first analog beam 7-1, is an interference signal against the terminal 2, which is a target of irradiation of a second analog beam 7-2. Similarly, it is likely that a signal transmitted by the terminal 2, which is the target of irradiation of the second analog beam 7-2, is an interference signal against the terminal 2, which is the target of irradiation of the first analog beam 7-1. Interference caused by the adjacent analog beams in this way is called inter-beam interference. It is highly likely that the inter-beam interference occurs, in particular, at an end of an analog beam.

In the example illustrated in FIG. 21, it is likely that interference occurs between a signal transmitted from the terminal irradiated by the first analog beam 7-1 and a signal transmitted from the terminal 2-5 irradiated by the second analog beam 7-2.

In this embodiment, to avoid the inter-beam interference, when there are the terminals adjacent to each other, that is, present at a distance within a fixed value and simultaneously present in different analog beams, resources are allocated to the terminals such that signals transmitted from the terminals 2 do not interfere.

Figure 22:
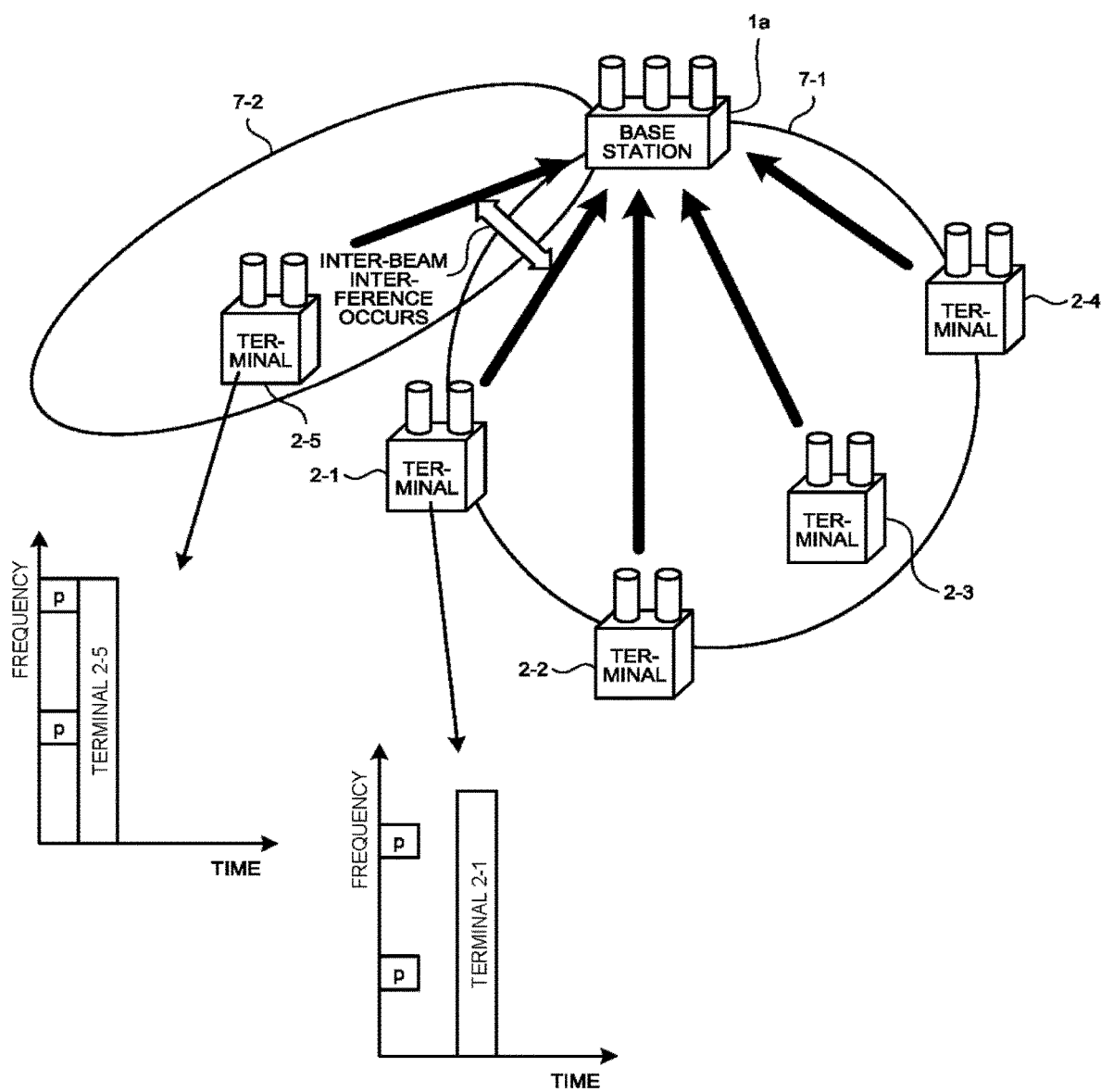
FIG. 22 is a diagram illustrating an example of resource allocation in the third embodiment.

FIG. 22 is a diagram illustrating an example of resource allocation in this embodiment. As illustrated in FIG. 22, in this embodiment, resources of an uplink are allocated such that transmission of the terminal 2-1 irradiated by the first analog beam 7-1 and transmission of the terminal 2-5 irradiated by the second analog beam 7-2 are different in at least one of a time and a frequency. In the example illustrated in FIG. 22, an SC-FDMA block, which is a second block in a slot, is allocated for data of the terminal 2-5 and an SC-FDMA block, which is a third block in the slot, is allocated for data of the terminal 2-1. In the example illustrated in FIG. 22, different bands in an OFDM block, which is a first block in the slot, are allocated to the terminal 2-1 and the terminal 2-5.

Figure 23:
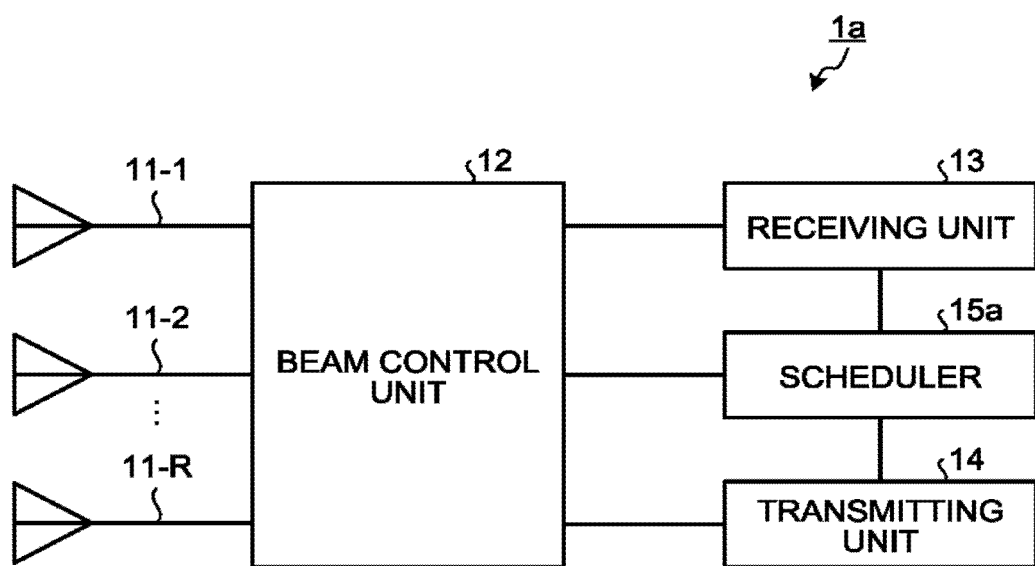
FIG. 23 is a diagram illustrating an example configuration of a base station in the third embodiment.

FIG. 23 is a diagram illustrating an example configuration of the base station 1a in this embodiment. The base station 1a is the same as the base station 1 in the first embodiment except that the base station 1a includes a scheduler 15a instead of the scheduler 15. The scheduler 15a acquires analog beam irradiation information of each of analog beams from the beam control unit 12. The analog beam irradiation information includes a slot number in which the analog beam is generated and information indicating the terminal 2 set as an irradiation direction in the analog beam. The scheduler 15a acquires position information of the terminals 2 from the receiving unit 13. The scheduler 15a performs, on the basis of the analog beam irradiation information and the position information of the terminals 2, resource allocation in the uplink of the terminals 2 to avoid inter-beam interference.

Figure 24:
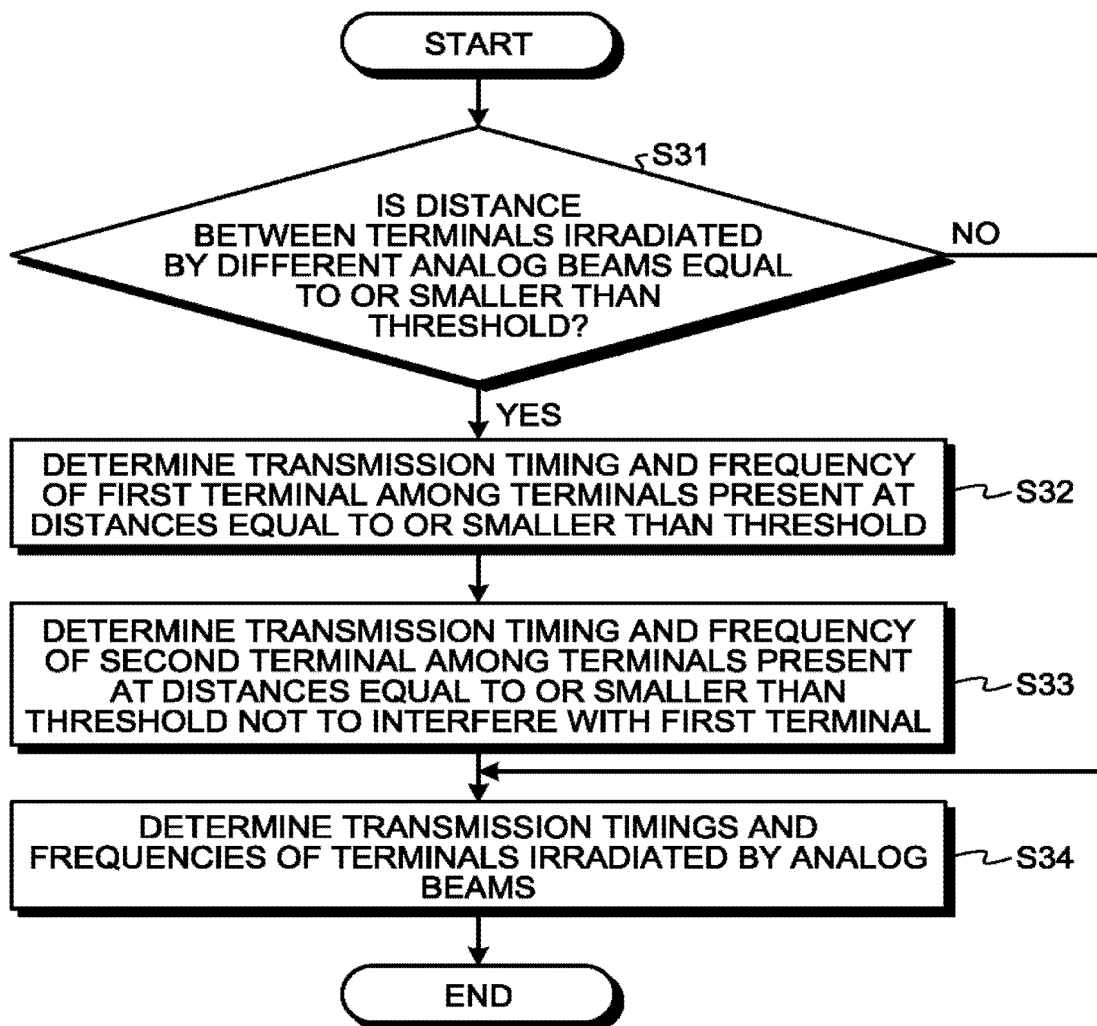
FIG. 24 is a flowchart illustrating an example of a resource allocation procedure in a scheduler in the third embodiment.

FIG. 24 is a flowchart illustrating an example of a resource allocation procedure in the scheduler 15a in this embodiment. First, the scheduler 15a determines whether the distance between the terminals 2 irradiated by different analog beams is equal to or smaller than a threshold (step S31). Specifically, the scheduler 15a respectively calculates, on the basis of the analog beam irradiation information and the position information of the terminals 2, distances among the terminals 2 irradiated by different analog beams that are simultaneously irradiated. When there is at least one distance equal to or smaller than the threshold among the calculated distances, the scheduler 15a determines that the distance between the terminals 2 irradiated by the different analog beams is equal to or smaller than the threshold. When there is no distance equal to or smaller than the threshold among the calculated distances, the scheduler 15a determines that the distance between the terminals 2 irradiated by the different analog beams is not equal to or smaller then the threshold.

For example, in the example illustrated in FIG. 22, the first analog beam 7-1 is set in irradiation directions toward the terminals 2-1 to 2-4, the second analog beam 7-2 is set in an irradiation direction toward the terminal 2-5, and the first analog beam 7-1 and the second analog beam 7-2 are simultaneously generated. In this case, the scheduler 15a calculates distances between the terminal 2-5 and the respective terminals 2-1 to 2-4. It is assumed that, among the calculated distances, the distance between the terminal 2-5 and the terminal 2-1 is equal to or smaller than the threshold and the distances between the terminal 2-5 and the respective terminals 2-1 to 2-3 are larger than the threshold. In this case, the scheduler 15a determines Yes at step S31. Note that, in the example illustrated in FIG. 22, one terminal is irradiated by the second analog beam 7-2. However, when a plurality of terminals are irradiated by the second analog beam 7-2, concerning the respective terminals, the scheduler 15a respectively calculates distances between the terminals and the terminals 2-1 to 2-4 irradiated by the first analog beam 7-1.

Subsequently, the scheduler 15a determines transmission timing and a frequency of a first terminal, which is one of the terminals 2 present at distances equal to or smaller than a first threshold (step S32). The transmission timing indicates the position of an SC-FDMA block in a slot for data. The frequency indicates a band in an OFDM block for an RS or an RS and a control signal. When frequency multiplexing is performed in the SC-FDMA block, the frequency includes a band for data as well. For example, in the example illustrated in FIG. 22, when it is assumed that the terminal 2-1 is the first terminal, a band in an OFDM block for an RS of the terminal 2-1 and a position of an SC-FDMA block for data of the terminal 2-1 are determined.

Subsequently, the scheduler 15a determines transmission timing and a frequency of a second terminal, which is not the first terminal, among the terminals 2 present at the distances equal to or smaller than the first threshold not to interfere with the first terminal (step S33). Specifically, the scheduler 15a allocates transmission timings and frequencies for data and for an RS (or for an RS and a control signal) such that at least one of the transmission timing and the frequency does not overlap at the second terminal and the first terminal. For example, in the example illustrated in FIG. 22, when it is assumed that the terminal 2-5 is the second terminal, a band in an OFDM block for an RS of the terminal 2-5 and a position of an SC-FDMA block for data of the terminal 2-5 are determined.

The scheduler 15 determines, for each of analog beams, transmission timings and frequencies of the terminals 2 irradiated by the analog beam (step S34) and ends the processing. At step S34, transmission timings and frequencies of the terminals 2 excluding the first terminal and the second terminal, the transmission timings and the frequencies of which are already determined, are determined. In this case, as in the first embodiment, the transmission timings and the frequencies are determined such that at least one of transmission timing and a frequency is different between the terminals 2 irradiated by the analog beam. For example, in the example illustrated in FIG. 22, at step S34, transmission timings and frequencies of the terminals 2-1 to 2-3 among the terminals 2-1 to 2-4 irradiated by the analog beam 7-1 are determined. Because the terminal 2 irradiated by the analog beam 7-2 is only the terminal 2-5, at step S34, allocation to the terminal 2 irradiated by the analog beam 7-2 is not carried out.

When determining at step S31 that the distance between the terminals 2 irradiated by the different analog beams is not equal to or smaller than the threshold (No at step S31), the scheduler 15a proceeds to step S34. Note that, when there are a plurality of terminals 2 present at distances equal to or smaller than the threshold, after repeating step S32 and step S33, the scheduler 15a proceeds to step S34.

Note that, in the example described above, to avoid the inter-beam interference, at least one of the transmission timings and the frequencies of the adjacent terminals 2 are differentiated. However, instead of this, the inter-beam interference can be reduced by using, for example, a method of multiplying data with a spreading code. In the example in this embodiment, the resource allocation is performed using the distance between the terminals. However, interference power from other analog beams can be measured and at least one of the transmission timings and the frequencies of the terminals 2 can be differentiated using the interference power.

Figure 25:
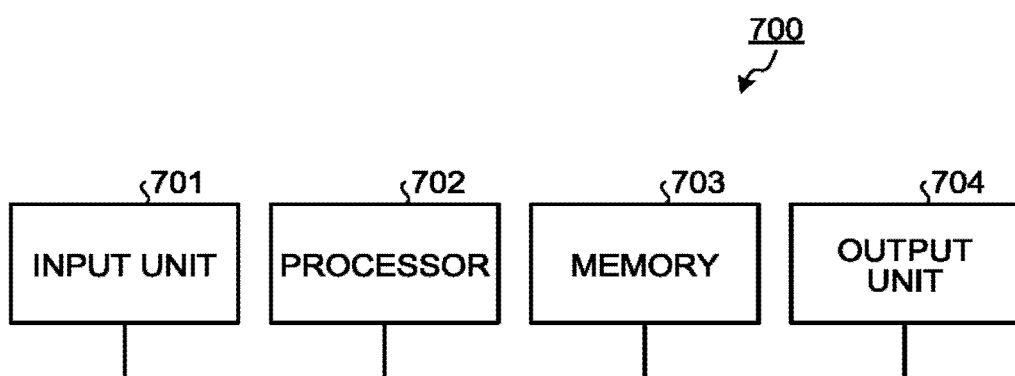
FIG. 25 is a diagram illustrating an example configuration of a control circuit in the third embodiment.

The scheduler 15a is realized by, for example, software. In this case, the scheduler 15a can be realized by a control circuit 700 illustrated in FIG. 25. The control circuit 700 includes an input unit 701, which is a receiving unit that receives data input from the outside, a processor 702, a memory 703, and an output unit 704, which is a transmitting unit that transmits data to the outside. The input unit 701 is an interface circuit that receives data input from the outside of the control circuit and gives the data to the processor. The output unit 704 is an interface circuit that sends data received from the processor 702 or the memory 703 to the outside of the control circuit. When the scheduler 15a is realized by the control circuit 700 illustrated in FIG. 25, the scheduler 15a is realized by the processor 702 reading out and executing a program corresponding to the scheduler 15a stored in the memory 703 and realized by software. The memory 703 is also used as a temporary memory in respective kinds of processing carried out by the processor 702. In this embodiment, the analog beam irradiation information and the position information of the terminals 2 are input values to the scheduler 15a. The allocation result of the resources is an output of the scheduler 15a. Every time the input values are input, the processor 702 can perform the processing. Input values for a fixed period can be accumulated in the memory 703 and the processor 702 can perform batch processing.

Note that, in this embodiment, when the terminals 2 are the same as the terminals in the first embodiment, the processing for avoiding the inter-beam interference is performed. However, the processing for avoiding the inter-beam interference can be performed on the terminals 2a in the second embodiment. In this case, the scheduler of the base station 1 in the second embodiment is changed to the scheduler 1 in this embodiment and the processing for avoiding the inter-beam interference is carried out as in this embodiment.

As described above, in this embodiment, as in the first embodiment, the OFDM block is provided in the slot and the terminal 2 transmit the RS in the OFDM block. When the distance between the terminals 2 irradiated by the simultaneously generated different analog beams is equal to or smaller than the threshold, at least one of the transmission timings and the frequencies of the terminals present at the distance equal to or smaller than the threshold are determined to be different. Therefore, effects same as the effects in the first embodiment are obtained. It is possible to suppress the inter-beam interference.

The configurations described in the embodiments above indicate examples of contents of the present invention. The configurations can be combined with other publicly-known technologies. A part of the configurations can be omitted or changed in a range not departing from the spirit of the present invention.

REFERENCE SIGNS LIST 1, 1a base station
2, 2-1 to 2-6, 2a terminal
3, 4, 7-1, 7-2 analog beam
11-1 to 11-R, 21, 21-1 to 21-K antenna
12 beam control unit
13, 13a receiving unit
14 transmitting unit
15, 15a scheduler
22, 22a transmitting unit
23 receiving unit
101 synchronization processing unit
102 CP removing unit
103, 202, 202-1 to 202-M DFT unit
104 equalization processing unit
105 channel estimating unit
106 demodulation processing unit
201, 201-1 to 201-M data generating unit
203, 203-1 to 203-K, 209-1 to 208-K interpolating unit
204, 204-1 to 204-K, 209-1 to 209-K on-frequency arranging unit
205, 205-1 to 205-K, 210-1 to 210-K IDFT unit
206, 206-1 to 206-K, 211-1 to 211-K CP adding unit
207, 207-1 to 207-M RS-generation-control-information generating unit
212, 212a switching operator
213, 213a control-signal generating unit
214, 215 precoding unit.

The invention claimed is:

1. A transmitting apparatus comprising:
a first signal generator to generate, on the basis of data, a first signal to be transmitted by single carrier block transmission;
a second signal generator to generate, on the basis of a known signal, a second signal to be transmitted by orthogonal frequency division multiplex transmission;
a switching operator to receive inputs of the first signal and the second signal, to select and output the second signal in a first transmission period within a fixed period that includes at least one slot, the one slot being configured by a plurality of blocks each of which is a unit of a communication time, and to select and output the first signal in a second transmission period within the fixed period so that both of the second signal and the first signal are output within the fixed period;
an antenna to transmit the signal output from the switching operator; and
a controller to control the second signal generator such that, in the first transmission period, the known signal is arranged in a frequency band allocated for transmission of the known signal from the transmitting apparatus among frequency bands usable in the orthogonal frequency division multiplex transmission.

2. The transmitting apparatus according to claim 1, wherein
the first signal generator includes:
a data generator to generate data;
a time-frequency converter to convert the data into a frequency domain signal and output the frequency domain signal;
a first frequency-time converter to convert the frequency domain signal into a time domain signal and output the time domain signal; and
a first CP adder to add a Cyclic Prefix to the signal output from the first frequency-time converter and output the signal to the switching operator as the first signal, and
the second signal generator includes:
a known-signal generator to generate the known signal;
an on-frequency arranger to arrange the known signal in a frequency band allocated for transmission of the known signal from the transmitting apparatus;

a second frequency-time converter to convert the signal output from the on-frequency arranger into the time domain signal; and a second CP adder to add the Cyclic Prefix to the signal output from the second frequency-time converter and output the signal to the switching operator as the second signal.

3. The transmitting apparatus according to claim 2, wherein when K is an integer equal to or larger than one, the transmitting apparatus includes K pieces of the antenna, when M is an integer equal to or larger than one, the first signal generator includes:

M pieces of each of the data generator and the time-frequency converter;

a first precoder to carry out first precoding processing for converting M pieces of the frequency domain signal output from the M time-frequency converters into K signals corresponding to the K antennas, respectively; and K pieces of the first frequency-time converters and K pieces of the first CP adder, the first frequency-time converter converts the signal after the first precoding processing into the time domain signal, the second signal generator includes:

M pieces of the known-signal generator;

a second precoder to carry out second precoding processing for converting M pieces of the frequency domain signal output from the M known-signal generator into K signals corresponding to the K antennas, respectively; and K pieces of the on-frequency arranger, K pieces of the second frequency-time converter, and K pieces of the second CP adder, and the on-frequency arranger arranges the signal after the second precoding processing in a frequency band allocated for transmission of the known signal from the transmitting apparatus.

4. The transmitting apparatus according to claim 1, wherein the second transmission period is a period allocated for transmission of the data from the transmitting apparatus by an apparatus that performs resource allocation on one or more transmitting apparatuses including the transmitting apparatus such that transmission times from the one or more transmitting apparatuses do not overlap in a third transmission period, which is a period excluding the first transmission period in the fixed period.

5. The transmitting apparatus according to claim 1, wherein the second signal generator further generates the second signal on the basis of a control signal, and the controller controls the second signal generator such that, in the first transmission period, the control signal is arranged in a frequency band allocated for transmission of the control signal from the transmitting apparatus among frequency bands usable in the orthogonal frequency division multiplex transmission.

6. A transmitting method comprising:

generating, on the basis of data, a first signal to be transmitted by single carrier block transmission;

generating, on the basis of a known signal, a second signal to be transmitted by orthogonal frequency division multiplex transmission;

controlling the generating of the second signal such that, in a first transmission period within a fixed period that includes at least one slot, the one slot being configured by a plurality of blocks each of which is a unit of a communication time, the known signal is arranged in a frequency band allocated for transmission of the known signal among frequency bands usable in the orthogonal frequency division multiplex transmission;

selecting, out of the first signal and the second signal, the second signal in the first transmission period and selecting the first signal in a second transmission period within the fixed period; and transmitting the signal selected in the selecting so that both of the second signal and the first signal are output within the fixed period.

* * * * *